(12) United States Patent
Hasegawa et al.

(10) Patent No.: US 7,431,070 B2
(45) Date of Patent: Oct. 7, 2008

(54) RARE EARTH MAGNET ALLOY INGOT, MANUFACTURING METHOD FOR THE SAME, R-T-B TYPE MAGNET ALLOY INGOT, R-T-B TYPE MAGNET, R-T-B TYPE BONDED MAGNET, R-T-B TYPE EXCHANGE SPRING MAGNET ALLOY INGOT, R-T-B TYPE EXCHANGE SPRING MAGNET, AND R-T-B TYPE EXCHANGE SPRING BONDED MAGNET

(75) Inventors: Hiroshi Hasegawa, Chichibu (JP); Masahide Utsunomiya, Chichibu (JP); Tadanao Ito, Tokyo (JP)

(73) Assignee: Showa Denko K.K., Tokyo (JP)

( * ) Notice: Subject to any disclaimer, the term of this patent is extended or adjusted under 35 U.S.C. 154(b) by 123 days.

(21) Appl. No.: 11/330,145

(22) Filed: Jan. 12, 2006

(65) Prior Publication Data
US 2006/0169361 A1 Aug. 3, 2006

Related U.S. Application Data

(62) Division of application No. 10/232,520, filed on Sep. 3, 2002, now Pat. No. 7,014,718.

(60) Provisional application No. 60/396,754, filed on Jul. 19, 2002, provisional application No. 60/367,720, filed on Mar. 28, 2002, provisional application No. 60/322,748, filed on Sep. 18, 2001.

(30) Foreign Application Priority Data

| Sep. 3, 2001 | (JP) | ............................. 2001-266278 |
| Mar. 11, 2002 | (JP) | ............................. 2002-065263 |
| Jul. 4, 2002 | (JP) | ............................. 2002-195404 |

(51) Int. Cl.
*B22D 11/16* (2006.01)
*B22F 9/10* (2006.01)
*H01F 1/057* (2006.01)

(52) U.S. Cl. .......................... 164/463; 75/333; 148/302
(58) Field of Classification Search ....................... None
See application file for complete search history.

(56) References Cited

U.S. PATENT DOCUMENTS 5,725,042 A * 3/1998 Hirose et al. ................. 164/114

(Continued)

FOREIGN PATENT DOCUMENTS

EP 0 924 717 A2 6/1999

(Continued)

*Primary Examiner*—John P. Sheehan
(74) *Attorney, Agent, or Firm*—Sughrue Mion, PLLC

(57) ABSTRACT

One object of the present invention is to provide a rare earth magnet alloy ingot, which has improved magnetic properties. In order to achieve the object, the present invention provides a rare earth magnet alloy ingot, wherein the rare earth magnet alloy ingot comprises an R-T-B type magnet alloy (R represents at least one element selected from among rare earth elements, including Y; and T represents a substance predominantly comprising Fe, with a portion of Fe atoms being optionally substituted by Co, Ni, Cu, Al, Ga, Cr, and Mn) containing at least one element selected from among Nd, Pr, and Dy in a total amount of 11.8 to 16.5% by atom and B in an amount of 5.6 to 9.1% by atom; and wherein as determined in an as-cast state of the alloy ingot, R-rich phase that measures 100 μm or more is substantially absent on a cross section.

19 Claims, 5 Drawing Sheets

U.S. PATENT DOCUMENTS

| | | | |
|---|---|---|---|
| 5,908,513 A | 6/1999 | Sasaki et al. | |
| 5,930,582 A | 7/1999 | Ito et al. | |
| 5,963,774 A | 10/1999 | Sasaki et al. | |
| 6,045,629 A | 4/2000 | Hasegawa et al. | |
| 6,419,723 B2 | 7/2002 | Hirota et al. | |
| 6,527,874 B2 | 3/2003 | Li | |
| 6,797,081 B2 * | 9/2004 | Hasegawa et al. | 148/539 |
| 2002/0153062 A1 * | 10/2002 | Hasegawa et al. | 148/105 |

FOREIGN PATENT DOCUMENTS

| | | |
|---|---|---|
| EP | 1 118 601 A1 | 7/2001 |
| JP | 07-109504 A | 4/1995 |
| JP | 09-170055 | 6/1997 |
| JP | 11-186016 A | 7/1999 |
| JP | 2002-301554 A | 10/2002 |
| WO | WO99/67187 A1 | 12/1999 |
| WO | WO0218078 | 3/2002 |

* cited by examiner

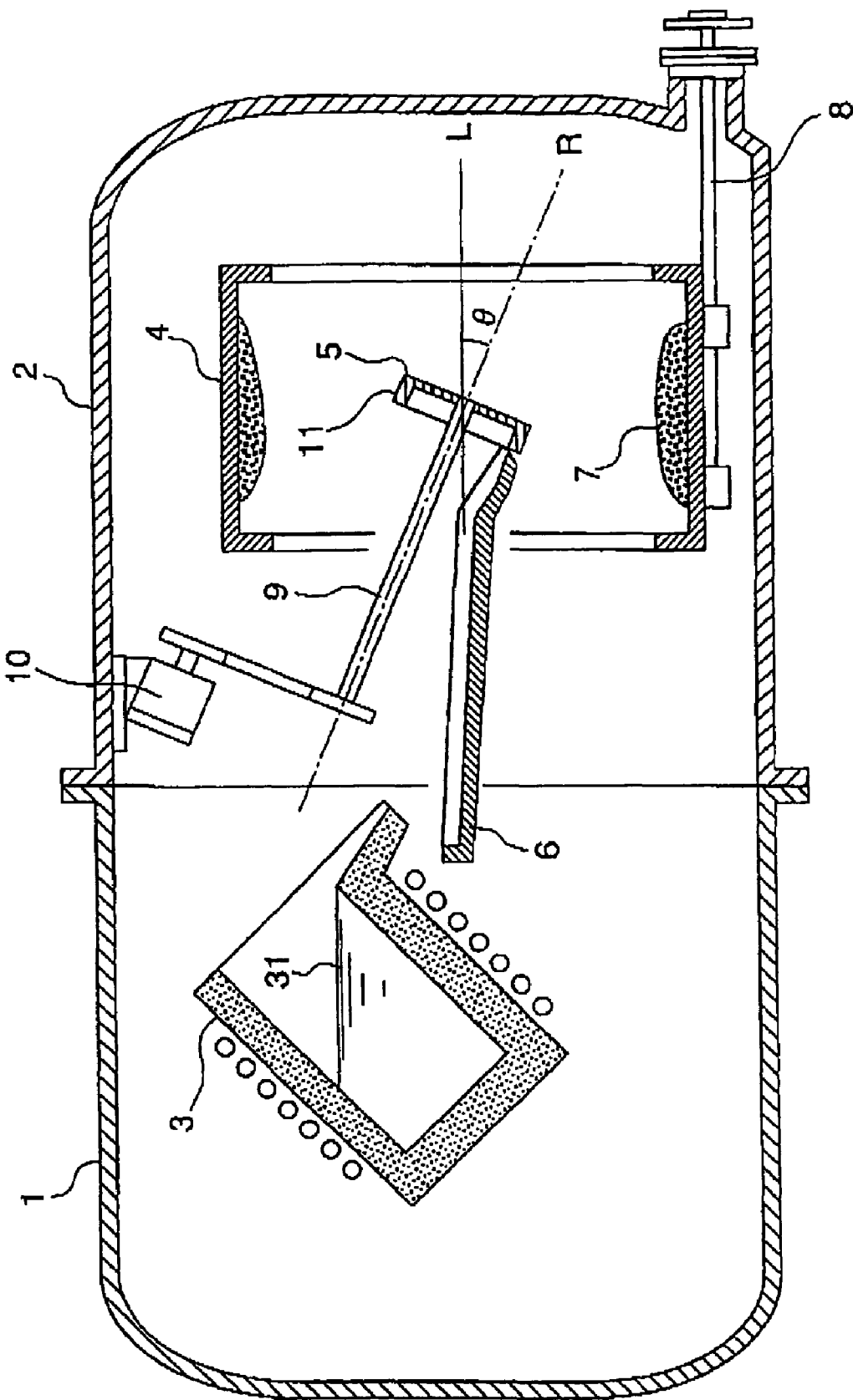

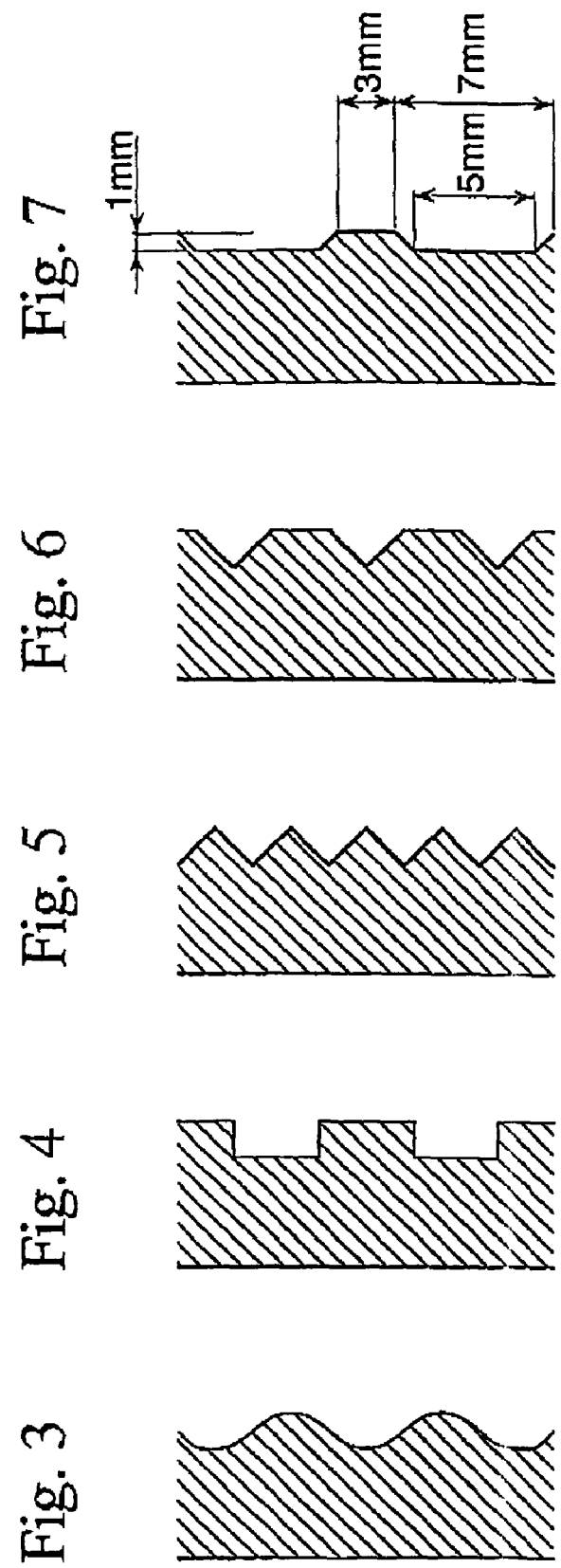

RARE EARTH MAGNET ALLOY INGOT, MANUFACTURING METHOD FOR THE SAME, R-T-B TYPE MAGNET ALLOY INGOT, R-T-B TYPE MAGNET, R-T-B TYPE BONDED MAGNET, R-T-B TYPE EXCHANGE SPRING MAGNET ALLOY INGOT, R-T-B TYPE EXCHANGE SPRING MAGNET, AND R-T-B TYPE EXCHANGE SPRING BONDED MAGNET

CROSS REFERENCE TO RELATED APPLICATIONS

This is a divisional of application Ser. No. 10/232,520 filed Sep. 3, 2002, now U.S. Pat. No. 7,014,718, which claims benefit of U.S. Provisional Application No. 60/322,748 filed Sep. 18, 2001, U.S. Provisional Application No. 60/367,720 filed Mar. 28, 2002 and U.S. Provisional Application No. 60/396,754 filed Jul. 19, 2002.

BACKGROUND OF THE INVENTION

1. Field of the Invention

The present invention relates to a rare earth alloy ingot, a sintered magnet comprising the rare earth alloy ingot, a production method for a rare earth alloy ingot, a production method for a rare earth alloy flake, an R-T-B type magnet alloy ingot, an R-T-B type magnet, an R-T-B type magnet alloy flake, an R-T-B type magnet alloy powder, an R-T-B type bonded magnet, an R-T-B type exchange spring magnet alloy ingot, an R-T-B type exchange spring magnet, an R-T-B type exchange spring magnet alloy powder, and an R-T-B type exchange spring bonded magnet.

2. Description of the Related Art

In recent years, production of Nd—Fe—B alloys serving as magnet alloys has sharply increased by virtue of high-performance characteristics of the alloys, and these alloys are employed in HDs (hard disks), MRI (magnetic resonance imaging), a variety of motors, etc. Typically, a portion of Nd atoms is substituted by another rare earth element such as Pr or Dy (as used herein, Nd and the substituted Nd are referred to as R, moreover, Y is at least one selected from the rare earth elements containing Y) or a portion of Fe is substituted by another metal element such as Co, Ni, Cu, Ga or Al (as used herein, Fe and the substituted Fe are referred to as T). Such substituted alloys as well as Nd—Fe—B alloys are generally referred to as R-T-B type alloys.

An R-T-B alloy contains, as the dominant phase, a ferromagnetic phase formed of $R_2T_{14}B$ crystals, which contribute to magnetization, and, in grain boundaries of the $R_2T_{14}B$ crystals, a nonmagnetic R-rich phase having a low melting point and containing a rare earth element(s) at high concentration. The R-T-B alloy is an active metallic material. Therefore, the alloy is generally melted and mold-cast in vacuum or under inert gas.

In a typical method of producing a magnet, an ingot of the alloy is pulverized to powder having a particle size of about 3 μm (as measured by means of FSSS (Fisher Sub-Sieve Sizer)); the powder is subjected to press-forming in a magnetic field; the resultant compact is sintered in a sintering furnace at a temperature as high as about 1,000 to about 1,100° C.; and in accordance with needs, the sintered product is heated, mechanically processed, and plated for corrosion prevention.

The R-rich phase plays the following important roles.
(1) Since the R-rich phase has a low melting point, the phase liquefies during sintering, thereby contributing to achievement of high density of the resultant magnet, leading to improved magnetization
(2) The R-rich phase functions to smoothen grain boundaries, thereby reducing the number of nucleation sites in a reversed magnetic domain, thereby enhancing the coercivity.
(3) The R-rich phase magnetically insulates the dominant phase, thereby enhancing the coercivity.

Thus, attainment of a uniformly dispersed R-rich phase is critical, because otherwise magnet characteristics of the produced magnet are adversely affected The distribution of the R-rich phase in a magnet—the final product—depends greatly on the metallographic structure of the raw material alloy ingot. Specifically, when the alloy is mold-cast, a slow cooling rate often results in formation of large crystal grains. In such a case, the particle size of the pulverized product becomes considerably smaller than that of the crystal grain size. When the alloy is mold-cast, R-rich phase is included not in crystal grains but virtually in crystal grain boundaries. Therefore, particles formed only of the dominant phase containing no R-rich phase and those formed only of the R-rich phase result, making it difficult to mix the dominant phase and R-rich phase homogeneously.

Another problem involved in mold cat is that γ-Fe tends to be formed as primary crystals, due to the slow cooling rate. At approximately 910° C. or lower, γ-Fe transforms into α-Fe, which deteriorates pulverization efficiency dung production of magnets. If α-Fe remains even after sintering, magnetic characteristics of the sintered product are deteriorated. Thus, the ingot obtained through mold casing must be subjected to homogenization treatment at high temperature for a long period of time in order to remove α-Fe.

In order to solve the above problems, the strip casting method hereinafter referred to as the SC method), which ensures a cooling rate during casing faster than that attainable by mold casting, is proposed and employed in actual production steps.

In the SC method, a molten metal is slowly poured onto a copper roll whose inside is cooled by water and which rotates at a peripheral velocity of about 1 mm/sec, and is solidified through rapid cooling, to thereby produce flake having a thickness in a range from about 0.1 to 1 mm (Japanese Patent Application Laid-Open (kokai) Nos. 05-222488 and 05-295490). During casting, the molten metal was solidified through rapid cooling, to thereby yield an alloy having a microcrystalline structure in which R-rich phase is minutely dispersed. Since the R-rich phase is minutely dispersed in the alloy, dispersion of R-rich phase in the product obtained by pulverizing and sintering the alloy becomes also satisfactory, to thereby successfully attain improved magnetic characteristics (Japanese Patent Application Laid-Open (kokai) Nos. 5-222488 and 5-295490). However, even when the above method is employed, α-Fe is unavoidably formed as the R content (%) decreases. For example, when the Nd content of an Nd—Fe—B ternary alloy is 28% by weight or less, α-Fe generation becomes significant The thus-formed α-Fe considerably deteriorates pulverizability of an alloy ingot in magnet production steps.

FIG. 9 is a back-scattered electron image, observed under an SEM (scanning electron microscope), showing a cross section of an Nd—Fe—B ingot (Nd: 30.0% by mass) cast through a conventional SC method.

In FIG. 9, Nd-rich (i.e., R of the R-rich phase is Nd) phase corresponds to bright portions. Some portion of the Nd-rich phase assumes the shape of linked rods extending in the solidification direction (left (roll side) to right (free side)). Another portion of the Nd-rich phase assumes a dot shape and is dispersed In the rod-shaped Nd-rich phase, the growth direction in grain bodies and that in crystal grains coincide with the longitudinal direction of the rod-shaped Nd-rich phase. Although the rod-shaped phase is slightly reduced or fragmented through heat treatment performed after casting, effects exerted during casting still prevail, and the dot-shaped or rod-shaped Nd-rich phase shows nonuniform dispersion. Such a microcrystalline feature is typical to a cross-sectional metallographic structure of an Nd—Fe—B alloy ingot cast through the SC method.

As explained above, the R-T-B type alloy contains, as the dominant phase, a ferromagnetic phase formed of $R_2T_{14}B$ crystals, which contribute to magnetization, and, in grain boundaries of the $R_2T_{14}B$ crystals, a nonmagnetic R-rich phase having a low melting point and containing a rare earth element(s) at high concentration. The R-T-B type alloy is an active metallic material. Therefore, the alloy is generally melted and cast in vacuum or under inert gas, and the cast alloy provides sintered magnets and bonded magnets. Below, the sintered magnet and the bonded magnets are explained.

(1) Sintered Magnet

Alloy ingots for sintered magnets are produced through, among other methods, the book molding method (hereinafter referred to as the BM method) and the SC method. In the BM method, a molten metal is cast in a copper mold or an iron mold whose inside is cooled by water, to thereby produce an ingot having a thickness of about 5 to about 50

The alloy ingot produced through any of the above methods is pulverized in an inert gas atmosphere, such as argon, nitrogen, to have a particle size of about 3 μm (as measured by means of an FSSS (Fisher Sub-Sieve Sizer)); the resultant powder is subjected to press-forming in a magnetic field at 0.8 to 2 ton/cm²; the resultant compact is sintered in a sintering furnace at a temperature as high as about 1,000 to about 1,100° C. (hereinafter, the steps of pulverization to sintering are collectively referred to as the powder metallurgical method); and in accordance with needs, the sintered product is heated at 500 to 800° C., mechanically processed, and plated for prevention of corrosion, to thereby produce a magnet.

Among these methods, the SC method provides a minute microcrystalline structure and forms an alloy in which a low-melting-temperature R-rich phase formed of concentrated nonmagnetic rare earth elements is minutely dispersed. Since the R-rich phase is minutely dispersed in the alloy, dispersibility of the R-rich phase after pulverizing and sintering the alloy also becomes satisfactory, to thereby successfully attain improved magnetic characteristics as compared with those of alloy ingots produced through the BM method.

(2) Bonded Magnet

An alloy ingot for bonded magnets, in the form of ribbon having a thickness in a range from 10 to 100 μm, is produced through the ultra-rapid-cooling method; i.e., by injecting a molten metal from a crucible, via an orifice provided in the bottom of the crucible, onto a copper roll which rotates at a high peripheral velocity of about 20 m/sec. The ribbon produced through the ultra-rapid-cooling method may be heated at 400 to 1,000° C. in accordance with needs, followed by pulverization to powder having a particle size of 500 μm or less. A mixture of the powder and a resin is press-molded or injection-molded, to thereby form a magnet. Since the ribbon is isotropic in terms of magnetic characteristics, the bonded magnet produced from the ribbon also exhibits magnetic isotropy.

Recently, there has been proposed an exchange spring magnet having a composite structure of a hard magnetic phase and a soft magnetic phase, each phase comprising crystal grains in a range from 10 to 100 nm in size. An alloy ingot for exchange spring magnets, containing considerably minute crystal grains, is generally produced through the ultra-rapid-cooling method. The produced ingot may be heated at 400 to 1,000° C. in accordance with needs, followed by pulverization to powder having a particle size of 500 μm or less. A mixture of the powder and a resin is press-molded or injection-molded, to thereby form an exchange spring magnet. In the exchange spring magnet, residual magnetic flux density and coercive force are generally determined by crystal grains of the soft magnetic phase and crystal grains of the hard magnetic phase, respectively. Since the hard magnetic phase of the exchange spring magnet must exhibit a highly anisotropic magnetic field, the hard magnetic phase is formed of a rare earth material such as $R_2T_{14}B$, $Sm_1Co_5$, or $Sm_2Co_{17}$. The soft magnetic phase is formed of Fe, $Fe_2B$, $Fe_3B$, etc., which exhibit high saturation magnetization.

In an as-cast state, R-T-B type magnet alloy ingots produced through the BM method or the SC method exhibit very weak magnetic characteristics, and so, they cannot be used as a magnet. The reason therefor is as follows. In the case of R-T-B type magnets, coercive force is exhibited on a nucleation-based mechanism. Specifically, crystal grin boundaries contain lattice defects and irregularities in an as-cast state, and these lattice defects and irregularities serve as nuclei for generating a reverse magnetic domain (hereinafter the nuclei are referred to as nucleation sites). Even when a weak reverse magnetic field is applied, magnetization inversion occurs from the nucleation sites, resulting in magnetization inversion of the entirety of crystal gas. In particular, an alloy ingot produced through the BM method contains a large number of crystal grams having a major grain size of about some mm, and an alloy ingot produced through the SC method contains a large number of crystal grains having a major grain size of 100 μm or more. By virtue of having such a large grain size, the volume required for magnetization inversion with respect to the total volume of the alloy is large, resulting in very poor magnetic characteristics.

To avoid this, as described above, the alloy ingot is pulverize to have a particle size of about 3 Sun, followed by sintering, to thereby produce a magnet. The thus-produced magnet has a crystal grain size of about 5 to about 20 μm, and the low-melting-temperature R-rich phase which becomes a liquid phase during sintering smoothens irregularities of grain boundaries, leading to reduction of nucleation sites, thereby enhancing coercive force. However, the steps of pulverization to sintering involve a considerably high cost Particularly when the alloy powder is an active R-T-B type magnet alloy powder, measures such as performing the steps of pulverization to sintering in an inert gas atmosphere are required from the viewpoints of product quality with less variation and greater safety in production steps. Such measures also increase the cost.

Meanwhile, ribbon for R-T-B type bonded magnets produced through the ultra-rapid-cooling method is heated at 500 to 800° C. in accordance with needs, so as to obtain optical magnetic characteristics. Through heat treatment, ribbon having a crystal grain size in a range from 10 to 100 nm and exhibiting magnetic isotropy is provided Since the ribbon-form ingot is not practical for use, the ribbon is pulverized to have a particle size of 500 μm or less. A mixture of the powder and a resin is press-molded or injection-molded, to thereby provide an isotropic bonded magnet There has also been proposed a method for producing bulk isotropic magnets including hot-pressing the ribbon at 700° C. and 1 ton/cm$^2$ (R. W. Lee, *Appl. Phys. Lett.* 46 (1985), Japanese Patent Application laid Open (kokai) No. 60-100402).

However, as compared with the BM method and the SC method, the ultra-rapid-cooling method has low productivity. In addition, a production method of bulk isotropic magnets including hot-pressing requires a high cost.

The alloy ribbon for exchange spring magnets produced through the ultra-rapid-cooling method is also heated at 500 to 800° C. in accordance with needs, so as to obtain optimal magnetic characteristics. Through heat treatment, ribbon having a crystal grain size in a range from 10 to 100 nm and exhibiting magnetic isotropy is provided. Since the ribbon-form ingot is not practical for use, the ribbon is pulverized to have a particle size of 500 μm or less. A mixture of the powder and a resin is press-molded or injection-molded, to thereby provide an isotropic bonded magnet. There has also been disclosed a method for producing bulk isotropic magnets including plasma sintering the ribbon (SPS method) (e.g., Ono, Waki, Fujiki, Shimada, Yamamoto, Sonoda, & Tani, Resume of Lectures, Convention of The Japan Institute of Metals, spring, 2000).

However, as described above, productivity of the ribbon through ultra-rapid-cooling method is low. In addition, a production method of bulk isotropic magnets including plasma sintering involves a significantly high cost.

The present inventors previously improved conventional centrifugal casting methods and devised another solidification process and an apparatus therefor (Japanese Patent Application Laid-Open (kokai) Nos. 08-13078 and 08-332557). Specifically, molten metal is introduced into a rotating mold via a box-like tundish, which is disposed in a reciprocative manner inside the mold and has a plurality of nozzles, whereby the molten metal is deposited and solidified on the inner surface of the rotating mold (this process is called a CC (Centrifugal Casting) process).

In the CC process, molten metal is continuously poured onto an ingot which has already been deposited and solidified. The additionally cast molten metal semi-solidifies while the mold makes one rotation, whereby the rate of solidification can be increased. However, in the production of an alloy of low R content through the CC method, α-Fe which is detrimental to magnetic characteristics and magnet production steps is unavoidably formed due to low cooling rate in a high-temperature zone.

In order to prevent formation of α-Fe in R-T-B type alloy ingots, the present inventors attempted to increase the solidification-cooling rate in the CC process by reducing the deposition rate of a molten metal and previously proposed a centrifugal casting method including sprinkling a molten metal from a rotating tundish and causing the sprinkled molten metal to be deposited on an inner surface of a rotating mold (Japanese Patent Application No. 2000-262605). Through employment of the above method, formation of α-Fe was found to be suppressed Thereby, a cast alloy ingot of low R content, which enhances magnetic characteristics of produced magnets, can be produced.

However, when the R content decreases, R-rich phase content decreases, possibly resulting in failure to produce sintered magnets of high density and enhanced coercive force. Therefore, it is thought that a minute and uniform dispersion state of the R-rich phase must be attained through more rapid cooling-solidification so as to attain further enhanced magnetic characteristics.

In addition, the thus-produced R-T-B type alloy ingot contains a large number of crystal grains having a major size of 1,000 μm or more, and exhibits very poor magnetic characteristics in an as-cast state. Therefore, further enhancement of the solidification-cooling rate, to thereby reduce the crystal grain size, is deemed necessary.

The present inventors have carried out extensive studies on improvement of conventional centrifugal casting methods and have invented a method which controls the rate of feeding a molten metal and raises the heat transfer efficiency from the cast surface of the alloy ingot which has been deposited and solidified to the inner surface wall of the casting mold.

Thereby, it was confirmed that alloy ingots in which R-rich phase is minutely and uniformly dispersed and which have not been conventionally produced can be obtained, and that sintered magnets produced from the ingots exhibit excellent magnetic characteristics.

In addition, thereby, it is possible to obtain a cast ingot of an R-T-B type alloy having fine crystal grains not available in the past, and it has been confirmed that the cast ingot, as it is, exhibits excellent isotropic magnetic properties.

The present invention has an object of providing a production method for a rare earth alloy ingot and a production method for a rare earth alloy flake which improve the efficiency of heat transfer from the cast surface of the cast ingot to the inner surface wall of the casting mold.

In addition, the present invention has an object of providing a rare earth magnet alloy ingot and a sintered magnet, which have improved magnetic properties.

In addition, the present invention has an object of providing an R-T-B type magnet alloy ingot, an R-T-B type magnet, an R-T-B type magnet alloy flake, an R-T-B type magnet alloy powder, an R-T-B type bonded magnet, an R-T-B type exchange spring magnet alloy ingot, an R-T-B type exchange spring magnet, an R-T-B type exchange magnet alloy powder, and an R-T-B type exchange spring bonded magnet, which have fine crystal grains not available conventionally.

SUMMARY OF THE INVENTION

In order to achieve the object, the present invention provides a rare earth magnet alloy ingot, characterised by comprising an R-T-B type magnet alloy (R represents at least one element selected from among rare earth elements, including Y; and T represents a substance predominantly comprising Fe, with a portion of Fe atoms being optionally substituted by Co, Ni, Cu, Al, Ga, Cr, and Mn.) containing at least one element selected from among Nd, Pr, and Dy in a total amount of 11.8 to 16.5% by atom and B in an amount of 5.6 to 9.1% by atom, and characterized in that, as determined in an as-cast state of the alloy ingot, R-rich phase that measures 100 μm or more is substantially absent on a cross section.

In addition, in order to achieve the object, the present invention provides another rare earth magnet alloy ingot, characterized by comprising an R-T-B type magnet alloy (R represents at least one element selected from among r earth elements, including Y; and T represents a substance predominantly comprising Fe, with a portion of Fe atoms being optionally substituted by Co, Ni, Cu, Al, Ga, Cr, and Mn.) containing at least one element selected from among Nd, Pr, and Dy in a total amount of 11.8 to 16.5% by atom and B in an amount of 5.6 to 9.1% by atom, and characterized in that, as determined in an as-cast state of the alloy ingot, an area in which R-rich phase that measures 50 μm or less is dispersed accounts for at least 50% the cross section.

In addition, in order to achieve the object, the present invention provides another rare earth magnet alloy ingot, characterized by comprising an R-T-B type magnet alloy (R represents at least one element selected from among rare earth elements, including Y; and T represents a substance predominantly comprising Fe, with a portion of Fe atoms being optionally substituted by Co, Ni, Cu, Al, Ga, Cr, and Mn.) containing at least one element selected from among Nd, Pr, and Dy in a total amount of 11.8 to 16.5% by atom and B in an amount of 5.6 to 9.1% by atom, and characterized in that, as determined in an as-cast state of the alloy ingot, R-rich phase having an aspect ratio of at least 20 is substantially absent on a cross section.

In the rare earth magnet alloy ingots, it is preferable that the crystal grains having a diameter of at least 1,000 μm as measured along the major axis occupy an area percentage of at least 5%, and average R-rich phase spacing is 10 μm or less.

In the rare earth magnet alloy ingots, it is also preferable that α-Fe is substantially absent.

In the rare earth magnet alloy ingots, it is preferable that the rare earth magnet alloy ingot is cast through centrifugal casting comprising receiving molten metal by means of a rotary body, sprinkling the molten metal by the effect of rotation of the rotary body; and causing the sprinkled molten metal to be deposited and solidify on an inner surface of a rotating cylindrical mold, the inner surface including a non-smooth surface.

In the rare earth magnet alloy ingot, it is preferable that an axis of rotation of the rotary body and an axis of rotation of the cylindrical mold form an angle of inclination θ.

In addition, in order to achieve the object, the present invention provides a sintered magnet produced from the rare earth magnet alloy ingot as a raw material.

In addition, in order to achieve the object, the present invention provides a method for producing a rare earth magnet alloy ingot, characterized by comprising receiving molten metal by means of a rotary body; sprinkling the molten metal by the effect of rotation of the rotary body; and causing the sprinkled molten metal to be deposited and solidify on an inner surface of a rotating cylindrical mold, the inner surface including a non-smooth surface.

In the method for producing a rare earth magnet alloy ingot, it is preferable that an axis of rotation of the rotary body and an axis of rotation of the cylindrical mold form an angle of inclination θ.

In the method for producing a rare earth magnet alloy ingot, it is also preferable that the rare earth magnet alloy ingot is an R-T-B type magnet alloy ingot.

In addition, in order to achieve the object, the present invention provides another method for producing a rare earth magnet alloy ingot comprising receiving a molten alloy of rare earth metal alloy by means of a rotary body, sprinkling the molten alloy by the effect of rotation of the rotary body, and causing the sprinkled molten alloy to be deposited and solidify on an inner wall surface of a rotating cylindrical mold; wherein a film having a thermal conductivity lower than that of material comprising the mold is provided to the inner wall surface of the cylindrical mold.

In the production method, it is preferable for the inner wall surface of the rotating cylindrical mold to contain a non-smooth surface.

In the production method, it is preferable for the thermal conductivity of the film to equal 80 W/mK or less.

In the production method, it is preferable for the film to be made of a metal, a ceramic, or a metal-ceramic composite.

In the production method, it is preferable for the film to be provided on the inner wall surface of the mold by at least one selected from coating, plating, spray coating, and welding.

In the production method, it is preferable for the film to have a thickness falling within a range of 1 μm to 1 mm.

In the production method, it is preferable for an axis of rotation of the rotary body and an axis of rotation of the cylindrical mold to form an angle of inclination θ.

In the production method, it is preferable that two or more layers comprising rare earth alloy ingot are deposited and casted on the inner wall surface of the mold by centrifugal casting method.

In the production method, it is preferable to further comprise the step of hot-working the obtained rare earth alloy ingot at 500 to 1,100° C.

In the production method, it is preferable to further comprise the step of hot-treating the obtained rare earth alloy ingot at 400 to 1,000° C.

In the production method, it is preferable to further comprise the steps of heat-treating the obtained rare earth alloy ingot at 1,000 to 1,100° C., and subsequently, an heat-treating at 400 to 1,000° C.

In the production method, it is preferable for the rare earth alloy ingot to be an R-T-B type magnet alloy (R represents at least one element selected from among rare earth elements, including Y; and T represents a substance predominantly comprising Fe, with a portion of Fe atoms being optionally substituted by Co, Ni, Cu. A, Ga, Cr, and Mn.).

In addition, in order to achieve the object, the present invention provides a production method for a rare earth alloy flakes comprising the steps of: receiving a molten alloy of rare earth metal alloy by means of a rotary body; sprinkling the molten alloy by the effect of rotation of the rotary body, and causing the sprinkled molten alloy to be deposited and solidify on an inner wall surface of a rotating cylindrical mold; wherein a film having a thermal conductivity lower than that of material comprising the old is provided to the inner wall surface of the cylindrical mold; and casting is performed while alloy flakes deposited on the inner wall surface of the cylindrical mold are scraped.

In the production method, it is preferable to further comprise the step of hot-treating the obtained rare earth alloy flakes at 400 to 1,000° C.

In the production method, it is preferable to further comprise the steps of heat-treating the obtained rare earth alloy flakes at 1,000 to 1,100° C., and subsequently, an heat-treating at 400 to 1,000° C.

In the production method, it is preferable for the rare earth alloy flakes to be R-T-B type magnet alloy flakes (R represents at least one element selected from among rare earth elements, including Y; and T represents a substance predominantly comprising Fe, with a portion of Fe atoms being optionally substituted by Co, Ni, Cu, Al, Ga, Cr, and Mn.).

In addition, in order to achieve the object, the present invention provides an R-T-B type magnet alloy ingot, wherein it comprises at least one element selected from among Nd, Pr, and Dy in a total amount of 11.8 to 16.5% by atom and B in an amount of 5.6 to 9.1% by atom, with a balance being T (T represents a substance predominantly comprising Fe, with a portion of Fe atoms being optionally substituted by Co, Ni, Cu, Al, Ga, Cr, and Mn.); wherein it contains crystal grin having a grain size of 10 μm or less in a volume of at least 50% on the basis of the entire volume of the alloy; and wherein it is produced by the production method for an R-T-B type magnet alloy ingot.

In the R-T-D type magnet alloy ingot, it is preferable to have a thickness of at least 1 mm as it is casted.

In addition, in order to achieve the object, the present invention provides an R-T-B type magnet, wherein it is obtainable by mechanical processing at least one method selected from cutting, grinding, polishing, and blanking the R-T-B type magnet alloy ingot.

In the R-T-B type magnet, it is preferable to have a cylindrical shape having an outer diameter of at least 100 mm.

In addition, in order to achieve the object the present invention provides an R-T-B type magnet alloy flakes, wherein they arm produced by the production method for the F-T-B type magnet alloy flakes; wherein they comprise at least one element selected from among Nd, Pr, and Dy in a total amount of 11.8 to 16.5% by atom and B in an amount of 5.6 to 9.1% by atom, with a balance being T (T represents a substance predominantly comprising Fe, with a portion of Fe atoms being optionally substituted by Co, Ni, Cu, Al, Ga, Cr, and Mn.); and wherein they contain crystal grains having a grain size of 10 µm or less in a volume of at least 50% on the basis of the entire volume of the flakes.

In the R-T-B type magnet alloy flakes, it is preferable to have maximum length of 5 cm or less, and the thickness of 1 mm or less.

In addition, in order to achieve the object, the present invention provides an R-T-B type magnet alloy powder produced through pulverization of the R-T-B type magnet alloy ingot to a particle size of 500 µm or less.

In addition, in order to achieve the object, the present invention provides an R-T-B type magnet alloy powder produced through pulverization of the R-T-B type magnet alloy flakes to a particle size of 500 µm or less.

In addition, in order to achieve the object, the present invention provides an R-T-B type bonded magnet produced by use of the R-T-B type magnet alloy powder.

In addition, in order to achieve the object, the present invention provides an R-T-B type exchange spring magnet alloy ingot, wherein it is produced by the production method for rare earth alloy ingot; it comprises at least one element selected from Nd, Pr, and Dy in a total amount of 1 to 12% by atom and B in an amount of 3 to 30% by atom, with a balance being T (T represents a substance predominantly comprising Fe, with a portion of Fe atoms being optionally substituted by Co, Ni, Cu, Al, Ga, Cr, and Mn.); it is produced through formation of a composite of crystal grains of a hard magnetic phase and crystal grains of a soft magnetic phase; and it contains crystal grains of a hard magnetic phase having a grain size of 1 µm or less and crystal grains of a soft magnetic phase having a grain size of 1 µm or less in a volume of at least 50% on the basis of the entire volume of the alloy.

In the R-T-B type exchange spring magnet alloy ingot, it is preferable to have a thickness of 1 mm or greater as it is casted.

In the R-T-B type exchange spring magnet alloy ingot, it is preferable to be heat treated at 400 to 1,000° C. after casting.

In addition, in order to achieve the object, the present invention provides an R-T-B type exchange spring magnet, wherein it is obtainable by mechanical processing at least one method selected from cutting, grinding, polishing, and blah, the R-T-B type exchange spring magnet alloy ingot.

In the R-T-B type exchange spring magnet, it is preferable to have a cylindrical shape having an outer diameter of at least 100 mm. In addition, in order to achieve the object, the present invention provides an R-T-B type exchange spring magnet alloy powder produced through pulverization of the R-T-B type exchange spring magnet alloy ingot to a particle size of 500 µm or less.

Furthermore, in order to achieve the object, the present invention provides an R-T-B type exchange spring bonded magnet produced by use of the R-T-B type exchange spring magnet alloy powder.

BRIEF DESCRIPTION OF THE DRAWINGS

FIG. 2 is a view showing an exemplary apparatus for producing a rare earth magnet alloy ingot according to the present invention.

FIG. 3 is a cross-sectional view of an exemplary feature of the inner surface of a mold employed in the present invention.

FIG. 4 is a cross-sectional view of an exemplary feature of the inner surface of another mold employed in the present invention.

FIG. 5 is a cross-sectional view of an exemplary feature of the inner surface of another mold employed in the present invention.

FIG. 6 is a cross-sectional view of an exemplary feature of the inner surface of another mold employed in the present invention.

FIG. 7 is a cross-sectional view of an exemplary feature of the inner surface of another mold employed in the present invention

DETAILED DESCRIPTION OF THE PREFERRED EMBODIMENTS

Figure 1:
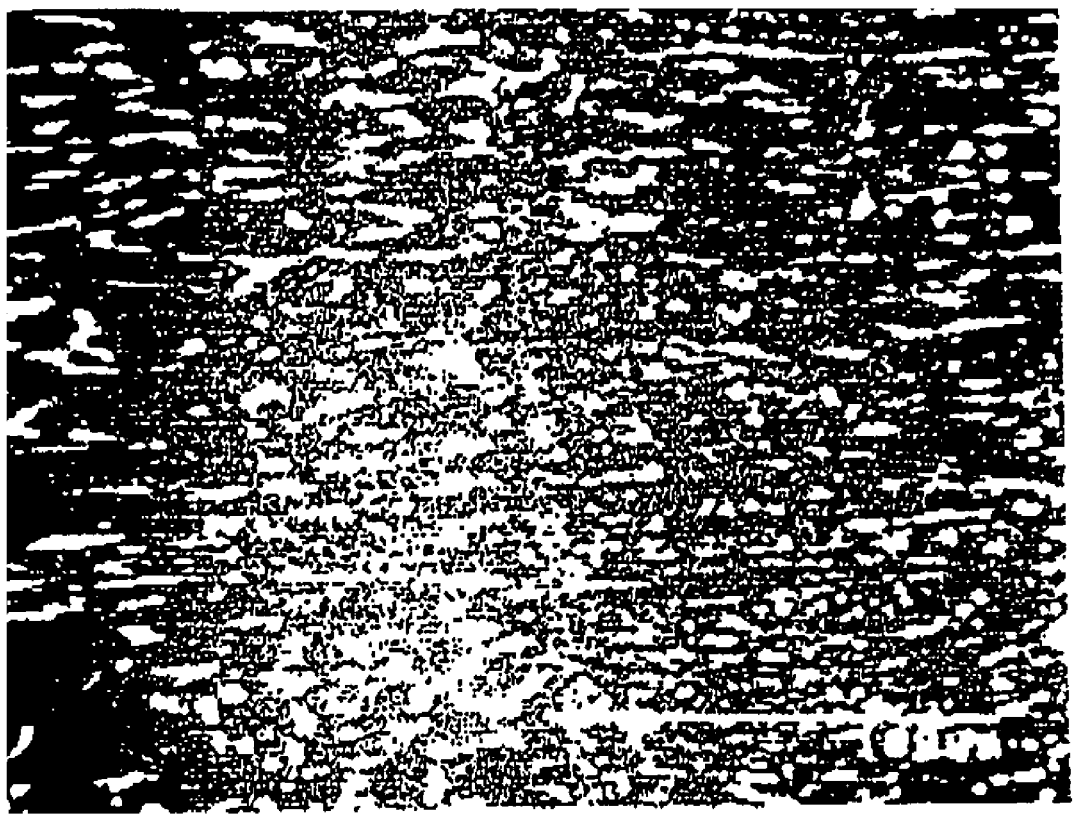
FIG. 1 is a view showing a metallographic structure (cross section) of a rare earth alloy ingot of the present invention.

FIG. 1 is a photograph showing a cross section of an ingot (Nd: 30.0% by mass) of the present invention. The ingot of the present invention is characterized in that Nd-rich phase is uniformly dispersed in an almost dot-like manner. The dot-shaped, dispersed Nd-rich phase generally has a maximum width of 50 µm or less, and virtually no wire-shaped or rod-shaped Nd-rich phase, which is observed in conventional SC materials, is identified. In particular, Nd-rich phase which measures 100 µm or more is substantially absent.

As used herein, the state "substantially absent" can be confirmed through observation of a cross section of an ingot in the following manner.

Specifically, a cross section of the ingot is polished, and arbitrary observation areas on the cross section are observed under an SEM at a magnification of ×400. In each observation area, the rod-shaped Nd-rich phase having a length of 100 µm or longer along a longitudinal direction is identified. When no Nd-rich phase of 100 µm or longer is observed in at least nine out of ten randomly selected observation areas, the Nd-rich phase is evaluated as "substantially absent."

The ingot of the present invention contains a minutely dispersed, dot-shaped Nd-rich phase, and in the SEM image, an area in which only Nd-rich phase that measures 50 µm or less is dispersed accounts for at least 50% the cross section. In other words, when ten arbitrary SEM photographs (×400) are taken, at least five of them show no Nd-rich phase measuring longer than 50 µm.

The ingot of the present invention is also characterized in that the ingot contains reduced rod-shaped R-rich phase. In other words, as observed on a cross section, R-rich phase having an aspect ratio of at least 20 is "substantially absent."

Regarding the above measurement, the state "substantially absent" generally refers to a level such that, among ten randomly selected SEM (×1,000) observation areas of a similarly polished cross section, the number of observation areas in which R-rich phase having an aspect ratio of at least 20 is present is about one or zero.

The ingot of the present invention is also characterized in that crystal grains having a diameter of at least 1,000 μm as measured along the major axis occupy an area percentage of at least 5%, leading to excellent crystal orientation, and average R-rich phase spacing is 10 En or less, leading to excellent sinterability of pulverized products.

The R-rich phase spacing is obtained through observation of a cross section under an SEM. The spacing is an average of spacing values in a direction normal to the cast thickness direction obtained through image processing or manual measurement of a photographic image.

In the ingot of the present invention, no substantial α-Fe is formed until the R content reaches approximately its stoichiometric value. The expression "no substantial α-Fe is formed" generally refers to a state in which, when presence of α-Fe is confirmed in ten arbitrary observation areas of an arbitrary cross section of au ingot, α-Fe is not identified in 90% or more of the observation areas. In the back-scattered electron image obtained through SEM, α-Fe is observed as dendrite-like dark portions.

The ingot of the present invention can be produced through the following method FIG. 2 is an illustration showing one example apparatus for producing a rare earth magnet alloy ingot of the present invention. With reference to the illustration, the above method will be described specifically.

An outline of the centrifugal casting apparatus according to the present invention is shown in FIG. 2. FIG. 2 is one example of the present invention. The rare earth alloy containing alloys for R-T-B type magnets, and the like, are melted in a melting chamber 1, for example, an alumina crucible 3, which is evacuated or contains an inert gas atmosphere for the purpose of the active properties thereof. The casting of the rare earth alloy is carried out by gradually tilting the crucible so that the molten metal 31 of the rare earth alloy flows in the runner 6, and is received by a cylindrical revolving body 5 having a base, for example. By the rotation of the rotating body 5, the molten metal is distributed from a plurality of holes 11 provided in the side surfaces of the rotating body 5 to the inner wall of the cylindrical mold 4 which is on the outside of the rotating body. The cylindrical rotating body 5 is manufactured so as to rotate around a rotation axis R which passes through the center of the circular base and is perpendicular to the base. In addition, it is suitable for the rotating body to have the function of distributing the poured molten metal to the periphery, and in addition to a cylinder shape having a base, the rotating body may have any shape capable of distributing the molten metal such as a disc shape, a cup shape angled outward toward the top, a cone shape angled outward toward the bottom, and so on. However, a cylindrical shape having a plurality of holes 11 in the side walls as shown in the figure is preferable.

With this type of rotating body, when molten metal is poured into the rotating body, the molten metal is dispersed to the periphery of the rotating body due to the force of the rotation or the centrifugal force. In that situation, by reducing the thermal capacity of the rotating body, it is possible for the molten metal to be deposited and solidify on the inner wall of the cylindrical mold without solidifying on the rotating body.

In addition, in FIG. 2, the mold is a arranged horizontally. However, as long as the position relationship with the rotating body is maintained, there is no problem in the cylindrical mold being arranged horizontally, or vertically, or being inclined.

In addition, by making an angle θ between the rotation axis R of the rotating body 5 and the rotation axis L of the mold 4, it is possible to extend the deposition surface longitudinally along the entire surface of the mold, and thereby, it is possible to control the rate of deposition of the molten metal. By means of setting this angle θ, it is possible to spread the molten metal over a large surface area of the cylindrical mold, and as a result, it is possible to increase the rate of solidification. In addition, by making the rotation axis R of the rotating body 5 variable, it is possible to spread the molten metal over an even greater surface area by varying the angle θ during casting.

For spreading the molten metal over the entire cylindrical mold 4, as an alternative to having an angle θ between the rotation axis R of the above-mentioned rotating body 5 and the rotation axis L of the mold 4, it is possible to obtain the same effects by moving the mold or the rotating body back and forward in the direction of the rotation axis of the mold.

In addition, it is preferable for the rotating body and the mold to be rotated in the same directions at different speeds of rotation. When the rotating body and the mold are rotated in opposite directions, a splash phenomenon occurs readily in which when the molten metal strikes the mold, it is scattered and does not stay on the mold, leading to a reduction in the yield.

In addition, when the rotating body and the mold rotate in the same direction with the same speed, the molten metal is deposited in a line on the same surface of the mold, and it is not distributed over the entire surface of the mold. Consequently, the speed of rotation of the two should not be too close, and usually, the difference in the speed of rotation of the two should be about 10% or greater and preferably 20% or greater.

It is necessary to select the number of rotations of the rotating body based on the condition that the molten metal will strike the inner surface of the mold due to centrifugal force. The specific number of rotations is determined in consideration of size of the rotating body and the mold, the direction in which the molten metal is sprayed out from the rotating body, the amount of molten metal which splashes without settling in the mold, and the like. When increasing the rate of solidification of the molten metal, it is preferable to determine the number of rotations such that the impact force of the molten metal on the inner wall of the mold is greater.

In addition, it is necessary for the number of rotations of the cylindrical mold 4 to produce a centrifugal force of 1 G or greater such that the deposited and solidified alloy ingot 7 does not drop. Since the cooling effect is increased by the pressing of the molten metal onto the inner wall of the mold, a centrifugal force of 2 G or greater is preferable.

The present invention is also characterized in that the inner surface of the rotatable mold 4 is rendered to be a non-smooth surface, thereby increasing the cooling area of the mold, leading to an increase in cooling performance and rate of cooling.

The non-smooth inner surface may have a curved surface as shown in FIG. 3. However, grooves having a cross-section formed of linear segments having angles therebetween as shown in FIGS. 4, 5, and 6 are preferable, since slippage of the molten metal from the mold surface, caused by shrinkage at solidification occurring at the moment of collision of the molten metal with the mold surface, can be prevented, thereby increasing adhesion of the molten metal with the mold and preventing deterioration of heat transfer.

The depth of the grooves must be preset in consideration of volume and surface area of the mold, specific heat, etc., and the depth is appropriately 0.5 nm to some nun. When the depth is considerably small, cooling effect becomes poor, resulting in failure to form desired metallographic structure, whereas when the depth is excessively large, removal of cast products from the inner surface becomes difficult.

The relationship between the size of molten metal droplets coming from the rotary body and the size and shape of the grooves is critical. When the molten metal droplets are large and the grooves have a small width and a large depth, a problem arises; i.e., molten metal droplets fail to completely penetrate the grooves, whereby a gap is formed between the mold and deposited molten metal, possibly deteriorating the cooling effect.

The mold is preferably formed of Cu, from the viewpoint of thermal conductivity. In addition to Cu, Fe is also employed without any problem.

When a conventional casting method is employed, R-rich phase is crystallized along the formed columnar crystals and assumes the shape of a rod. In addition, since the columnar crystals have a variety of growth directions, R-rich phase is dispersed in a nonuniform manner. However, according to the present invention, the metallographic structure tends to be formed of equiaxed crystals, since cooling performance of the inner surface of the mold is enhanced through increase in rate of solidification. In addition, R-rich phase is minutely crystallized and assumes virtually no rod shape. Thus, the R-rich phase is considered to be dispersed more uniformly.

According to the casting method of the present invention, a molten metal is deposited in a mold and a subsequent molten metal is added to the deposited molten metal that is being solidified. Since heat transfer for cooling is effected by mediation of a cast ingot, the thickness of the produced ingot is limiter Generally, the maximum thickness is some tens of mm, and the preferred thickness is about 1 to about 10 mm. When the thickness is as thin as less than 1 mm, handling in the subsequent magnet production step becomes cumbersome, whereas when the thickness is in excess of 10 mm, cooling performance of the surface of the ingot opposite the mold inner spice decreases.

Subsequently, an R-T-B type magnet alloy ingot which is produced through the casting method is pulverized, shaped, and sintered, to thereby produce an anisotropic magnet of excellent characteristics.

Typically, pulverization is sequentially performed in the order of hydrogen decrepitation, intermediate pulverization, and micro-pulverization, to thereby produce a powder generally having a size of approximately 3 μm (FSSS).

In the present invention, hydrogen decrepitation includes a hydrogen absorption step as a first step and a hydrogen desorption step as a second step. In the hydrogen absorption step, hydrogen is caused to be absorbed predominantly in the R-rich phase of alloy ingots in a hydrogen gas atmosphere at 267 hPa to 50,000 hPa. The R-rich phase is expanded in volume due to R hydride generated in this step, to thereby minutely reduce the alloy ingots themselves or generate numerous micro-cracks. Hydrogen absorption is carried out within a temperature range of ambient temperature to approximately 600° C. However, in order to increase expansion in volume of R-rich phase so as to effectively reduce the flakes in size, hydrogen absorption is preferably performed within a temperature range of ambient temperature to approximately 100° C. The time for hydrogen absorption is preferably one hour or longer. The R hydride formed through the hydrogen absorption step is unstable in the atmosphere and readily oxidized. Thus, the hydrogen-absorbed product is preferably subjected to hydrogen desorption treatment by maintaining the product at about 200 to about 600° C. in vacuum of 1.33 hPa or less. Through this treatment, R hydride can be transformed into a product stable in the atmosphere. The time for hydrogen desorption treatment is preferably 30 minutes or longer. If the atmosphere is controlled for preventing oxidation during steps to be carried out after hydrogen absorption to sintering, hydrogen desorption treatment can also be omitted.

Alternatively, pulverization may be performed through intermediate pulverization and micro-pulverization without performing hydrogen decrepitation Intermediate pulverization is a pulverization step in which alloy flakes are pulverized in an inert gas atmosphere such as argon gas or nitrogen gas, to a particle size of, for example, 500 μm or less. Examples of pulverizers for performing this pulverization include a Brawn mill. In the present invention, if the alloy flakes have been subjected to hydrogen decrepitation, the alloy flakes have already been reduced minutely or have included numerous minute cracks generated therein. Thus, intermediate pulverization may be omitted.

Micro-pulverization is a pulverization step for attaining a particle size of approximately 3 μm (FSSS). Examples of pulverizers for performing the pulverization include a jet mill. Upon micro-pulverization, the atmosphere is controlled to an inert gas atmosphere such as an argon gas atmosphere or nitrogen gas atmosphere. The inert gas may contain oxygen in an amount of 2% by mass or less, preferably 1% by mass or less. The presence of oxygen enhances pulverization efficiency and attains oxygen concentration of tee powder produced through pulverization to 1,000 to 10,000 ppm, to thereby enhance oxidation resistance. In addition, abnormal gain growth during sintering can be prevented.

In order to reduce friction between the powder and the inner wall of a mold and to reduce friction generated among powder particles for enhancing orientation, a lubricant such as zinc stearate is preferably added to the powder during molding in magnetic field. The amount of the lubricant to be added is 0.01 to 1% by mass. Although the lubricant may be added before or after micro-pulverization, the lubricant is preferably mixed sufficiently, before molding in magnetic field, in an inert gas atmosphere such as argon gas or nitrogen gas by use of a mixing apparatus such as a V-blender.

The powder pulverized to approximately 3 μm (FSSS) is press-molded in magnetic field by use of a molding apparatus. The mold to be employed is fabricated from a magnetic material and a non-magnetic material in combination in consideration of the orientation of magnetic field in the mold cavity. The pressure at molding is preferably 0.5 to 2 t/cm$^2$, and the magnetic field in the mold cavity during molding is preferably 5 to 20 kOe. The atmosphere during molding is preferably an inert gas atmosphere such as argon gas or nitrogen gas. However, if the powder has been subjected to the aforementioned anti-oxidation treatment, molding can be performed in air.

Sintering is performed at 1,000-1,100° C. Prior to reaching the sintering temperature, a lubricant and hydrogen contained in the micro-powder must be completely removed from a compact to be sintered. The lubricant is removed by maintaining the compact preferably under the conditions: in vacuum of $1.33 \times 10^{-2}$ hPa or under an Ar flow atmosphere at reduced pressure; at 300 to 500° C.; and for 30 minutes or longer. Hydrogen is removed by maintaining the compact preferably under the conditions: in vacuum of $1.33 \times 10^{-2}$ hPa or less; at 700 to 900° C.; and for 30 minutes or longer. The atmosphere during sintering is preferably an argon gas atmosphere or a vacuum atmosphere of $1.3\ 3 \times 10^{-2}$ hPa or less. A retention time of one hour or longer is preferred.

After completion of sintering, in order to enhance the coercive force, the sintered product may be treated at 500 to 650° C. in accordance with needs. An argon gas atmosphere or a vacuum atmosphere is preferred, and a retention time of 30 minutes or longer is preferred.

In addition to an R-T-B type magnet alloy, the casting method is applicable to rare earth alloys such as misch metal-Ni alloys used for anodes of nickel-hydrogen batteries. According to quick-cooling solidification involved in the method, segregation of Mn and other metals can be prevented.

Another feature of the present invention lies in the provision of a film having a thermal conductivity which is lower than the material of the mold on the inner wall of the cylindrical mold which rotates. The thermal conductivity of iron at normal temperatures is approximately 80 W/mK. The thermal conductivity of the film provided on the inner surface of the mold is preferably 80 W/mK or less. Since this film acts as a barrier to the transmission to the mold of the heat of the molten metal deposited on the mold, the temperature of the alloy ingot 7 deposited on the inner surface of the mold at the initial stage of the casting is maintained at a high temperature and does not fall very much. This high temperature alloy ingot is pressed against the inner surface of the mold by the centrifugal force of the mold, and the surface which is in contact with the mold becomes as smooth as the inner surface of the mold with almost no gaps between it and the mold. As a result, the heat transfer coefficient from the alloy ingot to the mold is conversely increased, and molten metal which is deposited thereafter has an extremely fast rate of cooling.

According to the present invention, since the rate of cooling of the molten metal deposited on the mold is extremely fast, the particle size of the crystals of the alloy ingot for the R-T-B type ret is extremely fine. It is possible to make the content of the alloy occupied by crystals having a particle size of 10 μm or less be 50% or greater of the total alloy, preferably 70% or greater of the total alloy, and more preferably 80% or greater of the total alloy. As a result, it is possible for the cast ingot to display isotropically high magnetic properties even in its cast form.

In addition, in increasing the rate of cooling of the deposited molten metal, the rate of deposition of the molten metal on the mold is also important. In order to increase the rate of cooling, it is necessary to slow the rate of deposition, and preferably this rate is an average of 0.1 mm/second or less, and more preferably an average of 0.05 mm/second or less.

When the film is not provided on the inner wall surface of the mold, the molten metal deposited, at an initial casting stage, on the inner wall of the mold is rapidly cooled and solidified in such a form as provided at deposition. Thus, the surface (mold side) of the alloy ingot is imparted with a large number of irregularities, which considerably deteriorate the rate of heat transfer from molten metal to be subsequently deposited onto the mold. As a result, crystal grain growth occurs in the ingot, thereby generating a large number of crystal grains having a major grain size of at least 1,000 μm.

The crystal grain size of the alloy ingot may be determined through observation of a cross section of the alloy ingot in the following manner. Specifically, the cross section of the alloy ingot is polished, and an arbitrary observation area is observed under a polarizing microscope (×200) on the basis of the magnetic Kerr effect. The size of each crystal grain observed in the photographed observation area is measured through, for example, image processing. The ratio of the volume of crystal grains having a specific grain size or less to the entire volume of the alloy may be obtained in the following manner. Specifically, ten arbitrary observation areas of a cross section of an alloy ingot are observed under the magnetic Kerr microscope (×200). From the photographed ten observation areas, the total area corresponding to crystal grains having the specific grain size or less is measured through, for example, image processing, and the total area of such crystal grains is divided by the sum often photographed observation areas.

In the present invention, the method of attaching the film to the inner wall of the mold may be by any one of coating, plating, spraying, or welding. For example, for coating, there are brush application, spraying, and the like, and for spraying, there are high-pressure-gas spraying, explosion spraying, plasma spraying, self-fluxing alloy spraying, and the like. In addition, for example, it is possible to additionally provide a coated film on a spayed film. The thickness of the film is preferably in a range from 1 μm to 1 mm, and more preferably 1 μm to 500 μm.

The material of the film is preferably selected from among a metal, a ceramic, and a metal-ceramic composite. In addition it is preferable for the film to comprises two or more layers which are made of different materials. The material for the film is selected such that the formed film has thermal conductivity lower than that of the mold. Examples of metallic materials for forming the film include stainless steel, Ti, V, Cr, Mn, Be, Co, Ni, Cu, Nb, Mo, Ta, W, and alloys thereof. Even when the mold and the film are both formed of Cu, the thermal conductivity of the film can be lowered as compared with the mold by, for example, providing a large number of micropores in the film. In a similar manner, Fe film can be used even when the mold is formed of Fe. Examples of ceramic materials for forming the film include boron nitride, sodium oxide, iron oxide, titanium oxide, aluminum oxide, calcium oxide, chromium oxide, zirconium oxide, tungsten oxide, vanadium oxide, barium oxide, manganese oxide, magnesium oxide, silicon oxide, rare earth oxides, tungsten carbide, chromium carbide, niobium carbide, titanium carbide, and composite ceramics thereof. In addition, composite films formed of the aforementioned metallic materials and ceramics may also be employed.

The inner wall surface of the rotatable mold may be rendered to be a non-smooth surface, thereby increasing the cooling area of the mold, whereby a film is provided thereon, leading to an increase in cooling performance and rate of cooling. The non-smooth inner wall surface may have a curved surface. However, grooves having a cross-section formed of linear segments having angles therebetween are preferable, since slippage of the molten metal from the mold surface, which would otherwise be caused by shrinkage at solidification occurring at the moment of collision of the molten metal with the mold surface, can be prevented, thereby increasing adhesion of the molten metal with the mold and preventing deterioration of heat transfer. The depth of the grooves must be preset in consideration of volume and surface area of the mold, specific heat, etc., and the depth is appropriately 0.5 mm to some mm. When the depth is considerably small, cooling effect becomes poor, resulting in failure to form desired metallographic structure, whereas when the depth is excessively large, removal of cast products from the inner surface becomes difficult.

According to the present invention, a new molten metal is cast on the sufficiently cooled ingot, and this step is repeated, to thereby produce a thickness-increased alloy ingot having a metallographic structure including microcrystal grains. In practice, the alloy ingot preferably has a thickness of at least 1 mm, more preferably at least 5 mm, most preferably at least 10 mm.

When the alloy ingot of the present invention is hot worked at high temperature in an inert gas atmosphere or in vacuum, anisotropy can be provided Examples of methods of preferable hot workings include die-upsetting, rolling, forging, and pressing. The temperature of deformation is preferably 500 to 1,100° C., more preferably 600 to 800° C. The preferable pressure is at least 0.5 ton/cm², more preferably at least 1 ton/cm².

In addition, it is possible to increase the coercive force and the squareness properties of the alloy ingot of the present invention by carrying out a heat treatment at 400 to 1,000° C. in a vacuum or in an inactive gas atmosphere after the casting or after the hot working process. Alternatively, it is possible to magnetize and further increase the coercive force by carrying out, after the casting or after the hot working process, a heat treatment at 1,000 to 1,100° C. in a vacuum or an inactive gas atmosphere, and then carrying out a heat treatment at 400 to 1,000° C. in a vacuum or in an inactive gas atmosphere.

The R-T-B type magnetic alloy of the present invention comprises at least one element selected from among Nd, Pr, and Dy in a total amount of 11.8 to 16.5% by atom, and B in an amount of 5.6 to 9.1% by atom, with a balance being T (T represents a substance predominantly comprising Fe, with a portion of Fe atoms being optionally substituted by Co, Ni, Cu, Al, Ga, Cr, and Mn.). When the total amount of at least one element selected from among Nd, Pr, and Dy is less than 11.8% by atom, R-rich phase content of the alloy is poor, thereby deteriorating magnetic characteristics, whereas when the total amount is in excess of 16.5% by atom, non-magnetic R-rich phase content increases excessively, thereby deteriorating magnetization. When the amount of B is less than 5.6% by atom, magnetic characteristics are deteriorated because of an insufficient B content, whereas when the amount of B is in excess of 9.1% by atom, nonmagnetic B-rich phase ($R_{1+6}T_4B_4$ phase) content increases excessively, thereby deteriorating magnetization. Therefore, the alloy is formed of at least one element selected from among Nd, Pr, and Dy in a total amount of 11.8 to 16.5% by atom and B in an amount of 5.6 to 9.1% by atom, with a balance being T.

In order to generate further minute crystal grains in the R-T-B type magnetic alloy, high-melting-point metals such as Ti, V, Cr, Mn, Zr, Nb, Mo, Hf, Ta, and W may be added. In this case, the total amount of the metals is preferably regulated to 1% by mass or less so as to prevent deterioration in magnetization.

The R-T-B type magnetic alloy of the present invention exhibits excellent magnetic characteristics isotropically even when in an ingot state after casting. Therefore, isotropic magnets exhibiting excellent magnetic characteristics can be produced through mere mechanical processing; e.g., cutting, grinding, polishing, or blanking, of an alloy ingot to form a predetermined shape. Briefly, steps of pulverization, pressing in a magnetic field, and sintering, which are necessary for producing the conventional sintered magnets, or steps of pulverization and press-molding or injection molding performed in production of bonded magnets can be omitted, thereby reducing production costs. Since the magnets produced through mechanical processing have a density higher than that of bonded magnets, strong magnets exhibiting high magnetization can be produced.

On the basis of deposition of a molten metal on the inner wall of the cylindrical mold, magnets of a cylindrical shape can be produced directly from a molten metal. In this case, in view of limitations of production apparatuses, the outer diameter of the cylindrical R-T-B type magnets is preferably controlled to 100 mm or more.

The R-T-B type magnet of the present invention contains a rare earth component and Fe, which are highly prone to oxidization Thus, the magnet is preferably coated with a resin or a metal such as Ni or Al. More preferably, the magnet is sequentially coated with a resin and a metal.

The aforementioned R-T-B type alloy ingot of the present invention contains crystal grains, most of which are minute. Thus, even when the alloy ingot is pulverized, magnetic characteristics are not greatly deteriorated. The ingot is pulverized to a particle size of 500 μm or less, and the powder is mixed with an epoxy resin or a similar resin and the resultant mixture press-molded; or the powder is mixed with Nylon or a similar resin and the resultant Mature injection-molded, to thereby produce a bonded magnet. The production method for R-T-B type magnet alloy ingot of the present invention attains productivity higher than that attained by the aforementioned ultra-rapid-cooling production method, thereby providing low-price R-T-B type bonded magnet alloy powder.

According to the present invention, casting is continued while rare earth alloy deposited on the inner wall surface of the mold are scraped by use of a scraper or a similar device, thereby producing flat rare earth alloy flakes having a maximum length of 5 cm and a thickness of 1 mm or less. After completion of casting, the flakes are heat-treated at 400 to 1,000° C. in vacuum or in an inert gas atmosphere, to thereby enhance coercive force and squareness properties. Alternatively, the flakes are heat-treated at 1,000 to 1,100° C. in vacuum or in an inert gas atmosphere and, subsequently, at 400 to 1,000° C. in vacuum or in an inert gas atmosphere, to thereby further enhance magnetization and coercive force.

The R-T-B type alloy flakes contain crystal grains, most of which are minute. Thus, even when the alloy flakes are pulverized, magnetic characteristics are not greatly deteriorated. The flakes are pulverized to a particle size of 500 μm or less, and the powder is mixed with an epoxy resin or a similar resin and the resultant mixture press-molded; or the powder is mixed with Nylon or a similar resin and the resultant mixture injection-molded, to thereby produce a bonded magnet. If the bonded magnets are produced by pulverizing alloy flakes is preferable because low-price alloy powder can be provided by virtue of high pulverization efficiency, as compared with pulverization of alloy ingots and obtaining the bonded magnets.

The production method for rare earth alloy of the present invention can provide an R-T-B TYPE exchange spring magnet alloy ingot comprising at least one element selected from among Nd, Pr, and Dy in a total amount of 1 to 12% by atom and B in an amount of 3 to 30% by atom, with a balance being T (T represents a substance predominantly comprising Fe, with a portion of Fe atoms being optionally substituted by Co, Ni, Cu, Al, Ga, Cr, and Mn.); containing crystal grains of the hard magnetic phase and the soft magnetic phase having a crystal grain size of 1 μm or less in a total volume of at least 50%, preferably at least 70%, more preferably at least 80%, on the basis of the entire volume of the alloy. The thickness of the alloy ingot is 1 mm or greater, preferably 5 mm or greater, and even more preferably 10 mm or greater.

The R-T-B type exchange spring magnet of the present invention contains a hard magnetic phase formed of $R_2T_{14}B$, exhibiting large anisotropic magnetic field, and a soft magnetic phase formed of at least one species selected from among Fe, Fe, and $Fe_3B$, exhibiting high saturation magnetization.

In the R-T-B type exchange spring magnet of the present invention, in order to generate further minute crystal grains, high-melting-point metals such as Vt, V, Cr, Mn, Zr, Nb, Mo, H, Ta, and W may be added. In this case, the total amount of the metals is preferably regulated to 1% by weight or less so as to prevent deterioration in magnetization.

When the R-T-B type exchange spring magnet is produced by the centrifugal casting method of the present invention, the rate of rotation of the mold is preferably regulated to generate centrifugal force of at least 2 G, more preferably at least 5 G, most preferably at least 10 G, such that the cooling effect is increased by bringing the molten metal into contact with the inner wall of the mold.

The rate of rotation of the rotary body is preferably regulated to impart, to the molten metal, centrifugal force of at least 5 G, more preferably at least 20 G, most preferably at least 30 G, such that collision of the molten metal with the inner wall surface of the mold is intensified, to thereby increase the solidification rate of the molten metal.

Rate of deposition of a molten metal on the inner wall surface of the mold is also critical. The average deposition rate for increasing the cooling rate of the deposited molten metal is 0.1 mm/sec or less, preferably 0.05 mm/sec or less, more preferably 0.03 mm/sec or less.

After casting, the R-T-B type exchange spring magnet alloy ingot is heat-treated at 400 to 1,000° C. in vacuum or in an inert gas atmosphere, to thereby enhance coercive force and squareness properties.

The exchange spring magnet alloy ingot of the present invention exhibits large percent spring-back, i.e., even when magnetization decreases in a reverse magnetic field, magnetization is almost completely restored to the initial value through controlling the magnetic field to 0. In addition, the alloy also exhibits excellent magnetic characteristics isotropically at an ingot state. Therefore, exchange spring magnets exhibiting excellent magnetic characteristics isotropically can be produced only trough mechanical processing; e.g., cutting, grinding, polishing, or blanking, of an alloy ingot to form a predetermined shape. Briefly, steps of pulverization and press molding or injection molding, which are required for producing the conventional bonded magnets can be omitted, thereby reducing production costs. In addition, since the magnets produced through mechanical processing have a density higher than that of bonded magnets, strong magnets exhibiting high magnetization can be produced.

On the basis of deposition of a molten metal on the inner wall of the cylindrical mold, the R-T-B type exchange spring magnets of a cylindrical shape can be produced directly from a molten metal. In this case, in view of limitations of production apparatuses, the outer diameter of the cylindrical magnets is preferably controlled to 100 mm or more.

When the exchange spring magnet alloy ingot of the present invention is intentionally deformed at high temperature in an inert gas atmosphere or in vacuum, anisotropy can be provided. Examples of methods of deformation include die-upsetting, rolling, forging, and pressing. The temperature of deformation is preferably 400 to 1,000° C., more preferably 600 to 800° C. The pressure required for deformation is at least 0.5 ton/cm$^2$, more preferably at least 1 ton/cm$^2$.

The exchange spring magnet of the present invention contains a rare earth component and Fe, which are highly prone to oxidization. Thus, the magnet is preferably coated with a resin or a metal such as Ni or Al. More preferably, the magnet is sequentially coated with a resin and a metal.

The aforementioned exchange spring magnet alloy ingot of the present invention contains crystal grains, most of which are minute. Thus, even when the alloy ingot is pulverized, magnetic characteristics are not greatly deteriorated. The ingot is pulverized to a particle size of 500 μm or less, and the powder is mixed with an epoxy resin or a similar resin and the resultant mixture press-molded; or the powder is mixed with Nylon or a similar resin and the resultant mixture injection-molded, to thereby produce a bonded magnet. When the exchange spring net alloy ingot is produced by the production method of the present invention, the alloy attains productivity higher than that attained by the aforementioned ultra-rapid-cooling production method, thereby providing low-price alloy powder.

EXAMPLES

Below, the Examples of the present invention and the Comparative Examples will be explained.

Example 1

Elemental neodymium, ferroboron, cobalt, aluminum, copper, and iron were mixed so as to obtain the following composition: Nd: 30.0% by mass: B: 1.00% by mass; Co: 1.0% by mass; Al: 0.30% by mass; and Cu: 0.10% by mass, a balance being iron. The resulting mixture was melted in an alumina crucible in an argon gas atmosphere at 1 atm by use of a high-frequency induction melting furnace. The resulting molten mixture was subjected to casting by use of the apparatus shown in FIG. 2.

The mold has an inside diameter of 500 mm and a length of 500 mm, and grooves shown in FIG. 7 having a depth of 1 mm and a bottom width of 5 mm are provided with intervals of 3 mm in the inner Race of the mold.

The rotary receptacle has an inside diameter of 250 mm and eight holes of 2 mm in diameter formed in the surrounding wall of the receptacle.

The angle θ formed by the axis of rotation of the rotary receptacle and the axis of rotation of the mold was fixed to 25', and the average molten metal deposition rate for deposition on the inner wall of the mold was 0.01 cm/sec.

The rotational speed of the mold was set to 189 rpm so as to generate a centrifugal force of 10 G. The rotational speed of the rotary receptacle was 535 rpm so as to impose a centrifugal force of about 40 G on molten metal.

The thus-obtained alloy ingot had a thickness of 6 to 8 mm as measured at a central portion of the cylindrical mold and a thickness of 11 to 13 mm as measured at thickest portions located in the vicinity of opposite end portions. The microstructure of the cross section was observed as a back-scattered electron image under an electron microscope. The results are shown in Table 1.

TABLE 1

| | Composition (% by mass) | | | | | | R-rich phase | | Crystal grain size | |
| | | | | | | | Aspect ratio | Spacing | (major axis) | |
| | Nd | Cu | B | Co | Al | Fe | ≦50 μm of ≧20 | μm | of ≧1,000 μm | Remarks |
| Ex. 1 | 30.0 | 0.10 | 1.00 | 1.0 | 0.30 | bal. | 60% | Not found | 6 | 20% | Mold: rough surface, 10 G |
| Ex. 2 | 28.0 | 0.10 | 1.00 | 1.0 | 0.30 | bal. | 65% | Not found | 3 | 10% | Mold: smooth, surface, 15 G |
| Comp. Ex. 1 | 30.0 | 0.10 | 1.00 | 1.0 | 0.30 | bal. | 10% | Moderate | 10 | 50% | Mold: smooth surface, 2.5 G |
| Comp. Ex. 2 | 30.0 | 0.10 | 1.00 | 1.0 | 0.30 | bal. | 0 | Many | 4 | 0 | SC method |

Example 2

Elemental neodymium, ferroboron, cobalt, aluminum, copper, and iron were mixed so as to obtain the following composition: Nd: 28.0% by mass; B: 1.00% by mass; Co: 1.0% by mass; Al: 0.30% by mass; and Cu: 0.10% by mass, a balance being iron. The resulting mixture was melted in an alumina crucible in an argon gas atmosphere at 1 atm by use of a high-frequency induction melting furnace. The resulting molten mixture was subjected to casting by use of the apparatus shown in FIG. 2.

A mold and a rotary receptacle having the same dimensions as those of Example 1 were employed. However, the inner surface of the mold was smooth, and the rotational speed of the mold was set to 231 rpm so as to generate a centrifugal force of 15 G.

The same conditions as described in relation to the Example were employed for the rotary receptacle.

The results are shown in the above Table 1.

Comparative Example 1

A mixture having a composition similar that of the alloy of Example 1 was prepared, and the mixture was melted in a manner similar to that of Example 1 and cast by use of a casting apparatus similar to that employed in Example 1. However, the inner surface of the mold had no grooves, and the surface was polished to be smooth in advance by use of sand paper (No. 240). The rotational speed of the mold was adjusted so as to generate a centrifugal force of 2.5 G The alloy ingot obtained through the above casting had a thickness of 7 to 8 mm as measured at a central portion of the cylindrical mold and a thickness of 12 to 13 mm as measured at thickest portions located in the vicinity of opposite end portions. Its a manner similar to that employed in Example 1, the microstructure of the cross section was observed as a back-scattered electron image. The results are shown in Table 1.

Comparative Example 2

Figure 8:
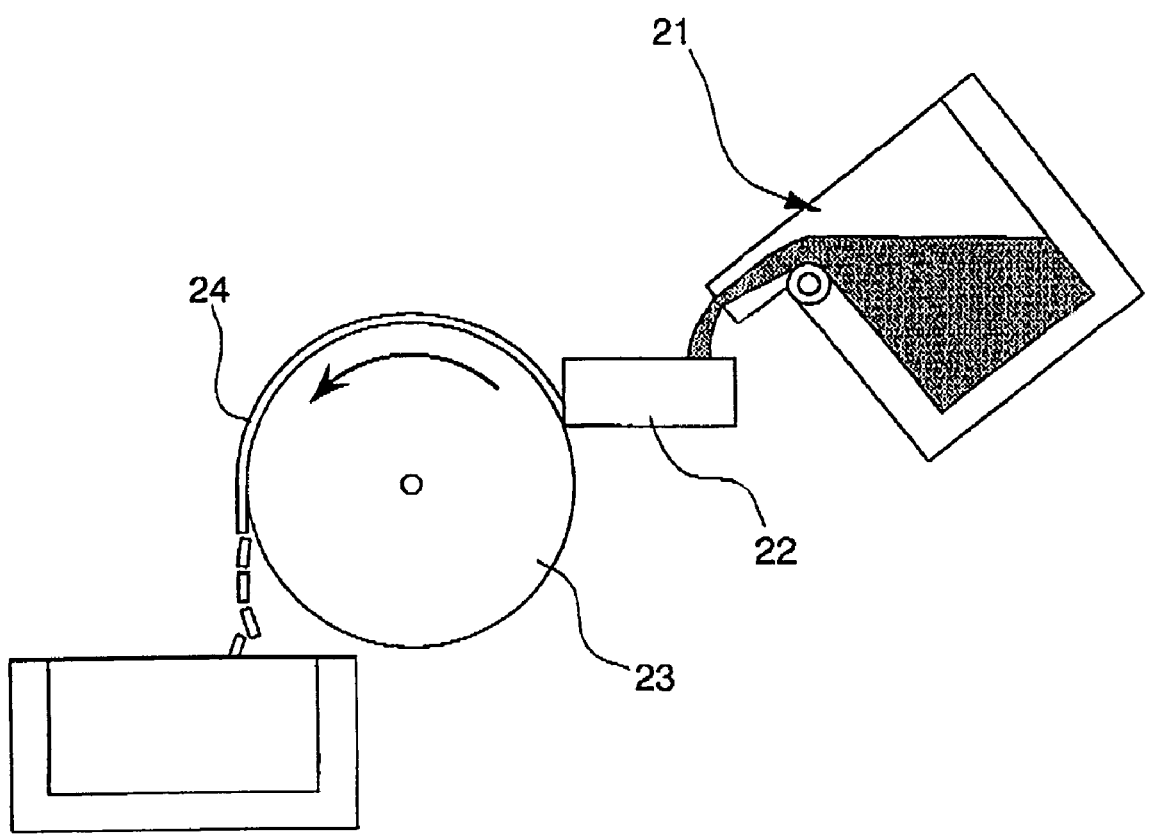
FIG. 8 is a view showing a conventional casting apparatus employed in the SC method.
Figure 9:
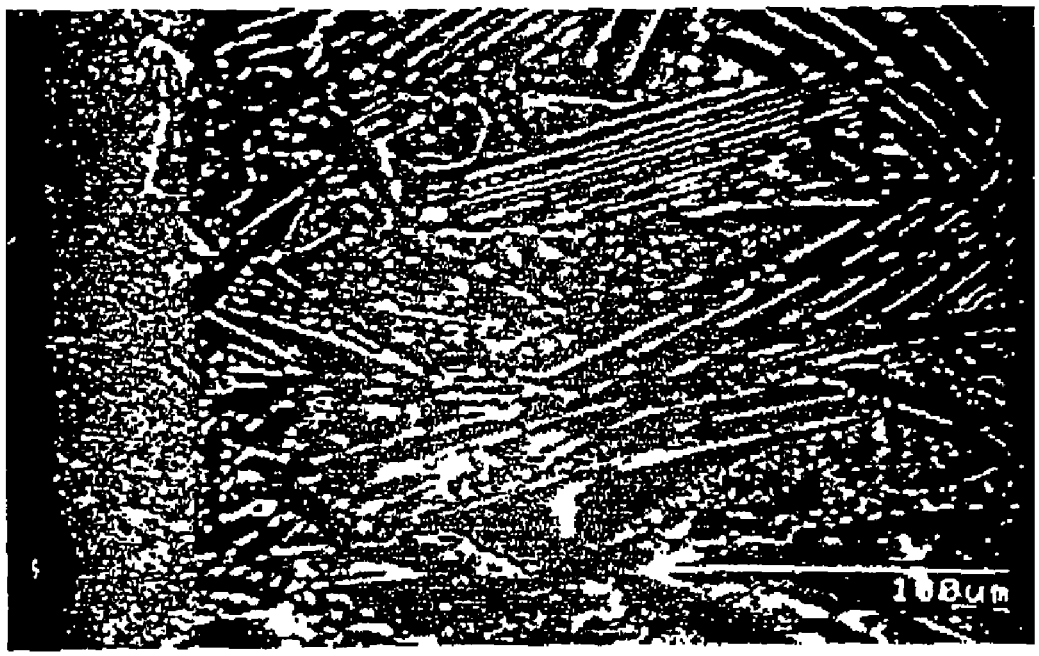
FIG. 9 is a view showing a metallographic structure (cross section) of an alloy ingot produced through a conventional SC method

A mixture having a composition similar that of the alloy of Example 1 was prepared, and the mixture was melted under argon at 1 atm and cast by use of a casting apparatus shown in FIG. 8 for the SC method. The water-cooling copper roller 23 had an outer diameter of 400 mm, and the roller was rotated at a peripheral velocity of 1 m/s, thereby yielding a flaky alloy ingot having a mean thickness of 0.32 mm. The micro-structure of the cross section of the thus-obtained alloy ingot was observed as a back-scattered electron image. The results are shown in Table 1.

Example 3

Example 3 describes a production example of sintered magnets. The alloy flakes produced in Example 1 were pulverized in the order of hydrogen decrepitation, intermediate pulverization, and micro-pulverization. Hydrogen absorption step—the first step of hydrogen decrepitation—was performed under the conditions: 100% hydrogen atmosphere, atmospheric pressure, and retention time of 1 hour. The temperature of the metal flakes at the start of hydrogen absorption reaction was 25° C. Hydrogen desorption step—subsequent step—was performed under the conditions: vacuum of 0-13 hPa, 500° C., and retention time of 1 hour. Intermediate pulverization was performed by use of a Brawn mill, and the hydrogen-decrepitated powder was pulverized in a 100% nitrogen atmosphere to a particle size of 42.5 μm or less. To the resultant powder, zinc stearate powder was added in an amount of 0.07% by mass. The mixture was sufficiently mixed in a 100% nitrogen atmosphere by use of a V-blender, and then micro-pulverized by use of a jet mill in a nitrogen atmosphere incorporated with oxygen (4,000 ppm), to a particle size of 3.2 μm (FSSS). The resultant powder was sufficiently mixed again in a 100% nitrogen atmosphere by use of a V-blender. The obtained powder was found to have an oxygen concentration of 2,500 ppm. Through analysis of the carbon concentration of the powder, the zinc stearate content of the powder was calculated to be 0.05% by mass.

Subsequently, the thus-obtained powder was press-molded in a 100% nitrogen atmosphere and a lateral magnetic field by use of a molding apparatus. The molding pressure was 1.2 t/cm$^2$, and the magnetic field in the mold cavity was controlled to 15 kOe.

The thus-obtained compact was maintained sequentially in vacuum of $1.33 \times 10^{-5}$ hPa at 500° C. for one hour and in vacuum of $1.33 \times 10^{-5}$ hPa at 800° C. for two hours, and was further maintained in vacuum of $1.33 \times 10^{-5}$ hPa at 1,060° C. for two hours for sintering. The density of the sintered product was as sufficiently high as 7.5 g/cm$^3$ or more. The sintered product was further heat-treated at 540° C. for one hour in an argon atmosphere.

Magnetic characteristics of the sintered product were measured by means of a direct-current BH curve tracer, and the results are shown in Table 2. In addition, a cross-section of the sintered product was mirror-polished, and the polished surface was observed under a polarizing microscope. The obtained mean crystal m size was 15 to 20 μm, with substantial homogeneity in size.

Comparative Examples 3 and 4

In Comparative Examples 3 and 4, each of the alloy flakes produced in Comparative Examples 1 and 2 was pulverized in a manner similar to that of Example 3, to thereby produce a powder having a particle size of 3.3 μm (FSSS). The powder was found to have an oxygen concentration of 2,600 ppm. In a manner similar to that of Example 3, each powder was molded in a magnetic field and sintered, to thereby produce an anisotropic magnet. Magnetic characteristics of the thus-produced sintered magnets are shown in Table 2.

TABLE 2

| | Br | iHc | BH$_{max}$ | Remarks |
|---|---|---|---|---|
| Ex. 3 | 14.22 kG | 11.38 kOe | 47.8 MGOe | Mold: rough surface, 10 G |
| Comp. Ex. 3 | 14.18 kG | 9.32 kOe | 47.3 MGOe | Mold: smooth surface, 2.5 G |
| Comp. Ex. 4 | 14.07 kG | 11.42 kOe | 46.8 MGOe | SC method |

Table 2 indicates that the magnet produced in Comparative Example 3 exhibits a coercive force (iHc) lower, by 2 kOe or more, t that of the magnet produced in Example 3, conceivably due to a poor dispersion state of R-rich phase. The magnet produced in Comparative Example 4 exhibits a Br as low as 0.15 kG conceivably due to crystal orientation inferior to that of the alloy of the present invention.

Example 4

Elemental neodymium elemental praseodymium, ferroboron, aluminum, eletrolytic copper, electrolytic cobalt, and electrolytic iron were mixed so as to obtain the following composition: Nd: 10.4% by atom (23.0% by mass); Pr: 3.2% by atom (7.0% by mass); B: 6.0% by atom (1.0% by mass); Al: 0.7% by atom (0.30% by mass); Cu: 0.1% by atom (0.10% by mass); Co: 1.1% by atom (1.0% by mass); and a balance of iron. The resulting mixture was melted in an alumina crucible in an argon gas atmosphere through high-frequency induction melting. The resulting molten mixture was subjected to casting under the following conditions using the device shown in FIG. 2.

The cylindrical mold which is made of iron (thermal conductivity at 27° C.: 80.3 W/mK) has an inside diameter of 500 mm and a length of 500 mm. Coating film (thermal conductivity at 27° C.: 12.6 W/mK) having a composition of Ni: 80% by mass and Cr: 20% by mass, and a thickness of 100 μm was provided on the inner wall of the mold through plasma spraying. The rotary body was a cylindrical receptacle having an inside diameter of 250 mm and eight holes of 3 mm in diameter formed in the surrounding wall of the receptacle. The axis L of rotation of the cylindrical mold is set to the horizontal direction. The angle θ of inclination formed by the axis R of rotation of the receptacle and the axis L of rotation of the cylindrical mold was fixed to 25 G during molding, and the average molten metal deposition rate for deposition on the inner wall of the mold was adjusted to 0.05 mw/sec. The rotational speed of the mold was controlled so as to generate a centrifugal acceleration of 10 G. The rotational speed of the rotary receptacle was controlled so as to impose a centrifugal force of about 20 G on molten metal.

The thus-obtained alloy ingot had a thickness of 8 mm as measured at a central portion of the cylindrical mold and about 10 mm as measured at thickest portions located in the vicinity of opposite end portions. A cross section of the alloy ingot was observed under a polar microscope for determining the crystal grain size. Through observation, the percent area in which the crystal grain size of 10 μm or less occupied was found to be 95%.

Then, a cube (side: 7 mm) was cut from the alloy ingot, and magnetic characteristics of the cube were determined by means of a BH curve tracer. The alloy was found to exhibit the following characteristics: residual magnetic flux density Br=8.6 kG; coercive force iHc=10.2 kOe; and maximum energy product $(BH)_{max}$=14.2 MGOe, and these characteristics were almost equivalent in three axial directions. The results indicate that the alloy suitably provides an alloy ingot for isotropic magnets.

Example 5

The same materials were mixed so as to obtain the composition similar to that of the alloy produced in Example 4. The resulting mixture was melted in an alumina crucible in an argon gas atmosphere through high-frequency induction melting. The resulting molten mixture was subjected to casing by use of the apparatus and under the conditions similar to those employed in Example 4. However, instead of the above coating film, boron nitride (BN) film (thermal conductivity at 27° C.: 17 to 42 W/mK) was provided in a thickness of 10 μm through spray coating on the inner wall surface of the mold.

A cross section of the thus-obtained alloy ingot was observed under a polarizing microscope for determining the crystal grain size. Through observation, the percent area in which the crystal grain size of 10 μm or less occupied was found to be 88%.

Then, a cube (side: 7 mm) was cut from the alloy ingot, and magnetic characteristics of the cube were determined by means of a BH curve tracer. The alloy was found to exhibit the following characteristics: Br=8.6 kG; iHc=10.1 kOe; and $(BH)_{max}$=14.0 MGOe, and these characteristics were almost equivalent in three axial directions. The results indicate that the alloy suitably provides an alloy ingot for isotropic magnets.

Example 6

Elemental neodymium, ferroboron, and electrolytic iron were mixed so as to obtain the following composition: Nd: 4.6% by atom (12.5% by mass); B: 15.2% by atom (3.1% by mass); and a balance of iron. The resulting mixture was melted in an alumina crucible in an argon gas atmosphere through high-frequency induction melting. The resulting molten mixture was subjected to casting by use of the apparatus shown in FIG. 2 and under the conditions described below.

The cylindrical mold which is made of iron (thermal conductivity at 27° C.: 80.3 W/mK) has an inside diameter of 500 mm and a length of 500 mm. Coating film (thermal conductivity at 27° C.: 12.6 W/mK) having a composition of Ni: 80% by weight and Cr: 20% by weight, and a thickness of 500 μm was provided on the inner wall of the mold through plasma spraying. The rotary body was a cylindrical receptacle having an inside diameter of 250 mm and eight holes of 2 mm in diameter formed in the surrounding wall of the receptacle. The axis L of rotation of the cylindrical mold is set to the horizontal direction. The angle θ of inclination formed by the axis R of rotation of the rotary receptacle and the axis L of rotation of the cylindrical mold was fixed to 25° during molding.

The average molten metal deposition rate for deposition on the inner wall of the mold was adjusted to 0.02 mm/sec. The rotational speed of the mold was controlled so as to generate a centrifugal acceleration of 20 G. The rotational speed of the rotary receptacle was controlled so as to impose a centrifugal force of about 40 G on molten metal.

A cross section of the thus-obtained alloy ingot was observed under a polarizing microscope for determining the crystal in size. Through observation, the percent area in which the crystal grain size of 1 μm or less occupied was found to be 65%.

Then, a cube (side: 7 mm) was cut from the alloy ingot, and magnetic characteristics of the cube were determined by means of a BH curve tracer. The alloy was found to exhibit the following characteristics: Br=11.8 kG; iHc=3.0 kOe; and $(BH)_{max}$=14.9 MGOe, and these characteristics were almost equivalent in three axial directions. The results indicate that the alloy suitably provides an alloy ingot for isotropic magnets. To the magnet obtained from the ingot, a reverse magnetic field of 2.5 kOe was applied after magnetization. When the application of the magnetic field was stopped (i.e., to 0 kG), Br was restored to 95% the initial value; i.e., remarkable sprung back. Therefore, the magnet was identified to be an isotropic exchange spring magnet.

Comparative Example 5

The same materials were mixed so as to obtain the composition similar to that of the alloy produced in Example 4. The resulting mixture was melted in an alumina crucible in an argon gas atmosphere through high-frequency induction melting. The resulting molten mixture was subjected to casting by use of the apparatus and under the conditions similar to those employed in Example 4. However, no coating film was provided on the inner wall surface of the mold, and the molten alloy was deposited and solidified directly on the inner wall surface of the iron mold A cross section of the thus-obtained alloy ingot was observed under a polarizing microscope for determining the crystal grain size. Through observation, a large number of columnar crystals having a major size of 1 mm or more were observed, and the percent area in which the crystal grain size of 10 μm or less occupied was found to be as low as 3%.

Then, a cube (side: 7 mm) was cut from the alloy ingot, and magnetic characteristics of the cube were determined by means of a BH curve tracer. The alloy was found to exhibit the following characteristics: Br=3.0 kG; iHc=0.8 kOe; and $(BH)_{max}$=0.4 MGOe. These characteristics exhibited their highest when measured in a plane normal to the mold surface, but are considerably low as compared with those of Example 4.

Comparative Example 6

The same materials were mixed so as to obtain the composition similar to that of the alloy produced in Example 6. The resulting mixture was melted in an alumina crucible in an argon gas atmosphere through high-frequency induction melting. The resulting molten mixture was subjected to casting by use of the apparatus and under the conditions similar to those employed in Example 4. However, no coating film was provided on the inner wall surface of the mold, and the molten alloy was deposited and solidified directly on the inner wall surface of the iron mold. A cross section of the thus-obtained alloy ingot was observed under a polarizing microscope for determining the crystal grain size. Through observation, a large number of columnar crystals having a major size of 1 mm or more were observed. However, many portions of dendritic phase in which no magnetic domain was identified were observed, and the phase seemed to prevent growth of columnar crystals. On the basis of a back-scattered electron image captured by a scanning electron microscope and by means of an energy dispersion X-ray analyzer, the dendritic phase in which no magnetic domain was observed was identified to α-Fe. In addition, through observation of the alloy ingot under a polarizing microscope, the percent area in which the crystal grain size of 10 μm or less occupied was found to be as low as 3%.

Then, a cube (side: 7 mm) was cut from the alloy ingot, and magnetic characteristics of the cube were determined by means of a BH curve tracer. The alloy was found to exhibit the following characteristics: Br=1.8 kG; iHc=0.2 kOe; and $(BH)_{max}$=unmeasurable. These characteristics exhibited their highest when measured in a plane normal to the mold surface, but are considerably low as compared with those of Example 6.

Example 7

The alloy ingot of Example 4 was pulverized to 500 μm or less in an argon gas atmosphere by use of a stamp mill, and iHc of the resultant powder was found to be 9.5 kOe as measured by means of a vibrating sample magnetometer (VSM), indicating a small decrease in iHc. The alloy powder was mixed with epoxy resin (3% by weight), and the resultant mixture was press-formed at 6 ton/cm² in an argon gas atmosphere. The resultant compact was fired at 180° C. in an argon gas atmosphere, to thereby cure the epoxy resin. After completion of curing, the density of the product was found to be 5.8 g/cm³. Magnetic characteristics of the product were determined by means of a BH curve tracer. The product was found to exhibit the following characteristics: Br=6.6 kG; coercive force iHc=9.1 kOe; and maximum energy product $(BH)_{max}$=8.4 MGOe.

Example 8

The alloy ingot of Example 4 was heated at 550° C. in vacuum for one hour. Then, a cube (side: 7 mm) was cut from the heat-treated alloy ingot, and magnetic characteristics of the cube were determined by means of a BH curve tracer. The alloy was found to exhibit the following characteristics: Br=8.7 kG; iHc=11.2 kOe; and $(BM)_{max}$=14.9 MGOe, and these characteristics were almost equivalent in three axial directions.

Example 9

The alloy ingot of Example 8 was pulverized to 500 μm or less in an argon gas atmosphere by use of a stamp mill, and iHc of the resultant powder was found to be 10.5 kOe as measured by means of a VSM, indicating a small decrease in iHc. By use of the alloy powder and in a manner similar to that of Example 7, a bonded magnet having a density of 5.8 g/cm³ was produced. Magnetic characteristics of the bonded magnet were determined by means of a BH curve tracer. The magnet was found to exhibit the following characteristics: Br=6.8 kG; iHc=10.2 kOe; and $(BH)_{max}$=8.9 MGOe.

Example 10

The alloy ingot of Example 4 was heated at 1,020° C. in an argon atmosphere for two hours, followed by an additional heat treatment at 550° C. in vacuum for one hour. Then, a cube (side: 7 mm) was cut from the heat-treated alloy ingot, and magnetic characteristics of the cube were determined by means of a BH curve tracer. The alloy was found to exhibit the following characteristics: Br=8.9 kG; iHc=11.3 kOe; and $(BH)_{max}$=15.5 MGOe. These characteristics were almost equivalent in three axial directions.

Example 11

The alloy ingot of Example 10 was pulverized to 500 μm or less in an argon gas atmosphere by use of a stamp mill, and iHc of the resultant powder was found to be 10.7 kOe as measured by means of a VSM, indicating a small decrease in iHc. By use of the alloy powder and in a manner similar to that of Example 7, a bonded magnet having a density of 5.8 g/cm³ was produced. Magnetic characteristics of the bonded magnet were determined by means of a BH curve tracer. The magnet was found to exhibit the following characteristics: Br=6.9 kG; iHc=14 kOe; and $(BH)_{max}$=9.3 MGOe.

Comparative Example 7

The alloy ingot of Comparative Example 4 was pulverized to 500 μm or less in an argon gas atmosphere by use of a stamp mill, and iHc of the resultant powder was found to be as low as 0.4 kOe as measured by means of a vibrating sample magnetometer (VSM). By use of the alloy powder and in a manner similar to that of Example 7, a bonded magnet having a density of 5.8 g/cm³ was produced. Magnetic characteristics of the bonded magnet were determined by means of a BR curve tracer. The magnet was found to exhibit the following characteristics: $Br_{max}$=2.3 kG; iHc=0.3 kOe; and $(BH)_{max}$=0.1 MGOe, which were considerably unsatisfactory.

Example 12

In order that the composition comprise Nd: 14.7% by atom (32.0% by mass), B: 6.1% by atom (1.0% by mass), Al: 0.7% by atom (0.30% by mass), Cu: 1.0% by atom (1.0% by mass), Nb: 0.4% by atom (0.5% by mass), and the remainder iron, each of the starting materials of metal neodymium, ferro-boron, aluminum, electrolytic copper, ferro-niobium, electrolytic iron were mixed, and melted by high frequency induction heating using an alumina crucible in an argon gas atmosphere, and then casting was carried out using the same apparatus and conditions as were used in Example 5. Thereafter, without removing the deposited alloy ingot from the cylindrical mold, onto this alloy ingot, an alloy ingot having the same composition as the previous composition was deposited under the same manufacturing conditions.

The thickness of the obtained alloy ingot was 16 mm at the center section of the cylindrical mold, and approximately 20 mm at the thickest sections in the vicinity of both edges. As a result of the measurement of the diameter of the crystals of the alloy ingot using a polarizing microscope, it was found that the area occupied by crystals having a particle size of 10 μm or less was 83%.

A cube have sides of 7 mm was cut out from the portion of the alloy which was deposited and solidified later, and the magnetic properties were measured using a BH curve tracer. The properties in three directions were approximately the same and Br=8.2 kG, iHc=4 kOe, and (BH) max=12.9 MGOe.

Example 13

A portion having a thickness of 16 to 18 mm was cut out from the alloy ingot of Example 12, and was enclosed in an evacuated iron vessel having a thickness of 3.2 mm. The iron vessel in which his alloy ingot was enclosed was placed in an atmospheric oven set at 800° C., sufficiently heated, and then rolled by passing between rollers set to have a draft of 30%. Thereafter, the vessel was returned to the atmospheric oven maintained at 800° C., sufficiently heated, and then rolled again with the interval between the rollers reduced with a draft of 30%. This rolling operation was repeated for a total of 4 times, and the alloy ingot was rolled to a thickness of 4.0 mm. Two pieces of this alloy ingot were laminated together and processed to give a cube having sides of 7 mm. The magnetic properties were measured by a BH curve trace, and it was found that the magnetic force in the direction of pressing was strongest, and the magnetic properties in this direction were Br=12.0 kG; iHc=12.9 kOe, and (BH) max=28.7 MGOe.

Example 14

The alloy ingot which was hot rolled in Example 13 was heat treated for 1 hour at 550° C. in a vacuum. Thereafter, two pieces of this alloy ingot were laminated together and processed to give a cube having sides of 7 mm. The magnetic properties were mead by a BH curve tracer, and it was found that the iHc and squareness properties in the direction of pressing were better than those for Example 13, and Br=12.0 kG; iHc=13.6 kOe, and (BH) max=29.8 MGOe.

Example 15

The alloy ingot which was hot rolled in Example 13 was heat treated for 2 hours at 1,020° C. in a vacuum, and then further heat treated for 1 hour at 550*C in a vacuum. Thereafter, two pieces of this alloy ingot were laminated together and processed to give a cube having sides of 7 mm. The magnetic properties were measured by a BH curve tracer, and it was found that the iHc and squareness properties in the direction of pressing were better than those for Example 14, and Br=12.0 kG; iHc=14.1 kOe, and (BH) max=31.6 MGOe.

Example 16

The alloy ingot of Example 6 was crushed to 500 μm or less in an argon gas atmosphere using a stamp mill. The iHc measured using VSM was 2.9 kOe, and degradation in the iHc was low.

Using this alloy powder, a bonded magnet having a density of 5.8 g/cm$^3$ was prepared using the same method as used in Example 7. The magnetic properties were measured by a BH curve tracer, and it was found that Br=9.1 kG, iHc=2.8 kOe, and (BH) max=8.9 MGOe.

Example 17

The alloy ingot of Example 6 was heat treated for 5 minutes at 750° C. in a vacuum. The magnetic properties were measured by a BH curve tracer. It was found that the properties in tree directions were approximately the same and that the magnetic properties had improved with Br=11.8 kG, iHc=4.2 kOe, and (BH) max=15.0 MGOe.

In addition, after this magnet was magnetized, a magnetic field in the opposite direction of 2.5 kOe was applied to it, and when the magnetic field was returned to 0, it was shown that Br had a large sprig back recovering 95% of the original, and that the magnet was an isotropic exchange spring magnet.

Example 18

The alloy ingot of Example 17 was crushed to 500 μm or less in an argon gas atmosphere using a stamp mill. The iHc measured using VSM was 4.0 kOe, and degradation in the iHc was low.

Using this alloy powder, a bonded magnet having a density of 5.8 g/cm$^3$ was prepared using the same method as used in Example 7. The magnetic properties were measured by a BH curve tracer, and it was found that Br=9.1 kG, iHc=3.9 kOe, and (BH) max=92 MGOe.

Example 19

In order that the composition comprise Nd: 10.8% by atom (23.5% by mass), Pr: 3.3% by atom (7.0% by mass), Dy: 0.6% by atom (1.5% by mass), B: 6.1% by atom (1.0% by mass), Al: 0.7% by atom (0.30% by mass), Co: 1.1% by atom (1.0% by mass), Cu: 0.1% by atom (0.1% by mass), Zr: 0.4% by atom (0.5% by mass), and the remainder iron, each of the starting materials of metal neodymium, metal praseodymium, metal dysprosium, ferro-boron, aluminum, electrolytic cobalt, electrolytic copper, ferro-zirconium, and electrolytic iron were mixed, and melted by high frequency induction heating using an alumina crucible in an argon gas atmosphere, and then a cylindrically shaped alloy ingot was obtained by casting under the following conditions.

The cylindrical mold was made of copper (thermal conductivity at 27° C. is 398 W/mK) and had an internal diameter of 150 mm and a length of 150 mm. A film having a thickness of 100 μm and a composition of SUS304 (thermal conductivity at 27° C. is 16.0 W/mK) was formed using plasma spraying onto the surface of the inner wall of the mold. The rotating body was a cylindrical vessel with an internal diameter of 50 mm, and 8 holes having diameters of 3 mm were formed in the side walls. In addition, the rotation axis L of the cylindrical mold and the rotation axis R of the vessel were both arranged in the vertical direction.

The average rate of deposition of the molten metal on the inner wall of the mold was 0.05 mm/second. The number of rotations of the mold in this case was set to produce a centrifugal acceleration of 20 G, and the rate of rotation of the vessel form rotating body exert a centrifugal force of approximately 10 G on the molten metal. In addition, during casting, the rotating vessel was moved back and forth over a distance of 50 mm in the vertical direction in a 4 second cycle.

The exterior of the cylindrically shaped alloy ingot was 150 nun, the thickness at the center section along the longitudinal axis was 8 mm, and the thickness was approximately 10 mm at the thickest sections in the vicinity of both edges. As a result of the measurement of the diameter of the crystals of the alloy ingot using a polarizing microscope, it was found that the area occupied by crystals having a particle size of 10 μm or less was 96%.

A cube have sides of 7 mm was cut out from the alloy ingot and the magnetic properties were measured using a BH curve tracer The properties in three directions were approximately the same and the residual magnetic flux density Br=8.1 kG, the coercive force iHc=16.8 kOe, and the maximum energy product (BH) max=12.5 MGOe. From this, it can be understood that the present alloy is suitable as a cylindrically shaped isotropic magnet.

Comparative Example 8

Each of the raw materials were mixed such that the composition was the same as the composition of Example 19, and melted by high frequency induction heating using an alumina crucible in an argon gas atmosphere, and casting was carried out using the same apparatus and under the same conditions as used in Example 19. However, there was no film of any type formed on the inner surface of the mold and the alloy was deposited and solidified on the surface of a copper mold. The exterior of the obtained cylindrically shaped alloy ingot was 150 mm, the thickness at the center section along the longitudinal axis was 8 mm, and the thickness was approximately 10 mm at the thickest sections in the vicinity of both edges. As a result of the measurement of the diameter of the crystals of the alloy ingot using a polarizing microscope, it was found that the area occupied by crystals having a particle size of 10 μm or less was 5%.

A cube have sides of 7 mm was cut out from this alloy ingot and the magnetic properties were measured using a BH curve tracer. The properties were highest when measured in the plane perpendicular to the surface of the mold and were Br=2.8 kG; iHc=1.2 kOe, and (BH) max=0.4 MGOe. These are extremely low compared with those of Example 4.

Example 20

Using the apparatus used in Example 19, a cylindrically shaped alloy ingot manufactured using the same composition and under the same conditions as in Example 19 was heat treated for 1 hour at 550° C. in a vacuum. A cube having sides of 7 mm was cut out from this heat treated alloy ingot. The magnetic properties were measured by a BH curve tracer, and it was found that the properties were approximately the same in three directions with Br=8.2 kG; iHc=17.2 kOe, and (BH) max=13.1 MGOe. These magnetic properties are better than those for the alloy of Example 19.

Example 21

Using the apparatus used in Example 19, cylindrical shaped alloy ingot manufactured using the same composition under the same conditions as in Example 19 was heat treated for 2 hours at 1,020° C. in an argon atmosphere, and then further heat treated for 1 hour at 550° C. in a vacuum.

A cube having sides of 7 mm was cut out from this heat treated alloy ingot. The magnetic properties were measured by a BH curve tracer, and it was found that the properties were approximately the same in three directions with Br=8.3 kG; iHc=17.5 kOe, and (BR) max=13.7 MGOe. These magnetic properties are better than those for the alloy of Example 20.

Example 22

Casting was carried out using the same composition under the same conditions as in Example 4, and using the same apparatus as used in Example 4. However, a cylindrical copper mold (thermal conductivity at 27° C. is 80.3 W/mK) was used in which grooves of a depth of 1 mm with a base of a width of 5 mm had been cut at 3 mm intervals in the inner surface wall, and on which a film having a thickness of 100 μm and a composition of SUS304 (thermal conductivity at 27° C. is 16.0 W/mK) had been formed by means of plasma spraying, thereafter.

The thickness of the obtained alloy ingot was 8 mm at the center section of the cylindrical mold, and approximately 10 mm at the thickest sections in the vicinity of both edges. As a result of the measurement of the diameter of the crystals of the alloy ingot using a polarizing microscope, it was found that the area occupied by crystals having a particle size of 10 μm or less was 98%.

A cube having sides of 7 mm was cut out from this alloy ingot. The magnetic properties were measured by a BH curve tracer, and it was found that the properties were approximately the same in three directions with the residual magnetic flux density Br=8.6 kG, the coercive force iHc=11.0 kOe, and the maximum energy product (BH) max=14.4 MGOe.

Example 23

Using the apparatus used in Example 19, a cylindrically shaped alloy ingot was obtained by mixing alloy starting materials to obtain the same composition as in Example 6, and using the same conditions as in Example 19. However, the average rate of deposition of the molten metal on the inner wall of the mold was 0.02 mm/second.

The exterior of the obtained cylindrically shaped alloy ingot was 150 mm, the thickness at the center section along the longitudinal axis was 8 mm, and the thickness was approximately 10 mm at the thickest sections in the vicinity of both edges. As a result of the measurement of the diameter of the crystals on a cross-section of the alloy ingot using a polarizing microscope, it was found that the area occupied by crystals having a particle size of 1 μm or less was 65%. The area occupied by crystals having a particle size of 1 μm or less was 65%.

A cube have sides of 7 mm was cut out from the alloy ingot and the magnetic properties were measured using a BH curve tracer. The properties in three directions were approximately the same and Br=11.8 kG, iHc=3.0 kOe, and (BH) max=14.8 MGOe. From this, it can be understood that the present alloy is suitable as a cylindrically shaped isotropic exchange spring magnet.

In addition, after this magnet was magnetized, a magnetic field in the opposite direction of 2.5 kOe was applied to it, and when the magnetic field was returned to 0, it was shown that Br had a large spring back recovering 95% of the original. It is possible to judge this magnet to be an isotropic exchange spring magnet.

Example 24

Using the apparatus used in Example 19, a cylindrically shaped alloy ingot was obtained by mixing alloy starting materials to obtain the same composition as in Example 6, and using the same conditions as in Example 19. However, the average rate of deposition of the molten metal on the inner wall of the mold was 0.02 mm/second. In this case, the alloy ingot was heat treated for 5 minutes at 750° C. in a vacuum. A cube having sides of 7 mm was cut out from this heat treated alloy and the magnetic properties were measured using a BH curve tracer. The properties in three directions were approximately the same and Br=11.8 kG, iHc=4.1 kOe, and (BH) max=15.0 MGOe. The magnetic properties were better than those in Example 23.

In addition, after this magnet was magnetized, a magnetic field in the opposite direction of 2.5 kOe was applied to it, and when the magnetic field was returned to 0, it was shown that Br had a large spring back recovering 95% of the original, and that this magnet was an isotropic exchange spring magnet.

Example 25

Alloy starting materials were mixed to obtain the same composition as in Example 4, and melted by high frequency induction heating using an alumina crucible in an argon gas atmosphere, and then casting was conducted under the following conditions.

The cylindrical mold was made of iron (thermal conductivity at 27° C. is 80.3 W/mK) and had an internal diameter of 600 mm and a length of 600 mm. A film having a thickness of 100 μm and a composition of 80% by mass Ni-20% by mass Cr (thermal conductivity at 27° C. is 12.6 W/mK) was formed using plasma spraying onto the surface of the inner wall of the mold The rotating body was a cylindrical vessel with an internal diameter of 250 mm, and 8 holes having diameters of 3 mm were formed in the side walls. In addition, during casting, the rotation axis L of the cylindrical mold was in the horizontal direction and the inclined angle θ formed by the rotation axis R of the vessel and the rotation axis L of the cylindrical mold was fixed at 25°. In addition, in order for removal of the alloy flakes deposited and solidified on the inner surface of the mold during casting, a scraper was installed on the inner wall of the mold so as to make contact with the leading edge. In addition, a metal plate guard wall having a thickness of 5 mm was arranged on the scraper side of the rotating body to prevent the direct deposition of the molten metal onto the scraper itself during casting.

The average rate of deposition of the molten metal onto the inner wall of the mold was 0.05 mm/second. In this example, the number of rotations of the mold was set so that the centrifugal acceleration was 10 G, and the rate of rotation of the vessel form rotating body exerted a centrifugal force of approximately 20 G on the molten metal.

The size of the obtained alloy flakes was of the order of 5 mm and the thickness was about 50 to 100 μm. As a result of the measurement of the diameter of the crystals of the alloy flakes using a polarizing microscope, it was found that the area occupied by crystals having a particle size of 10 μm or less was 95%.

The iHc of the alloy flakes was measured by VSM and found to be 10.2 kOe. This alloy flakes was crushed to 500 μm or less in an argon gas atmosphere using a stamp mill, and thereafter, a bonded magnet having a density of 5.8 g/cm$^3$ was prepared using the same method as used in Example 7. The magnetic properties were measured by a BH curve tracer, and it was found that Br=6.6 k; the coercive force iHc=9.8 kOe, and the maximum energy product (3H) max 8.4 MGOe.

Example 26

The alloy flakes of Example 25 was heat treated for 1 hour at 550° C. in a vacuum. The iHc of this heat treated alloy flakes was measured by VSM and found to be 10.2 kOe. This alloy flakes was crushed to 500 μm or less in an argon gas atmosphere using a stamp mill, and thereafter, a bonded magnet having a density of 5.8 g/cm$^3$ was prepared using the same method as used in Example 7. The magnetic properties were measured by a BH curve tracer, and it was found that Br=6.8 kG, the coercive force iHc=10.6 kOe, and the maximum energy product (BH) max=8.9 MGOe.

Example 27

The alloy flakes of Example 25 was heat treated for 2 hours at 1,020° C. in an argon atmosphere, and thereafter it was heat treated for 1 hour at 550° C. in a vacuum. The iHc of this heat treated alloy flakes was measured by VSM and found to be 11.3 kOe. This alloy flakes was crushed to 500 μm or less in an argon gas atmosphere using a stamp mill, and there after, a bonded magnet having a density of 5.8 g/cm$^3$ was prepared using the same method as used in Example 7. The magnetic properties were measured by a BH curve tracer, and it was found that Br 6.9 kG, the coercive force iHc=11.0 kOe, and the maximum energy product (13H) max 9.3 MGOe.

What is claimed is:

1. A production method for a rare earth magnet alloy ingot, wherein the production method comprising receiving molten metal by means of a rotary body; sprinkling the molten metal by the effect of rotation of the rotary body; and causing the sprinkled molten metal to be deposited and solidify on an inner surface of a rotating cylindrical mold; and wherein the inner surface includes a non smooth surface is comprised of grooves having a depth of 0.5 to 1 mm.

2. A production method for a rare earth magnet alloy ingot according to claim 1, wherein an axis of rotation of the rotary body and an axis of rotation of the cylindrical mold form an angle of inclination θ.

3. A production method for a rare earth magnet alloy ingot according to claim 1, wherein the rare earth magnet alloy ingot is an R-T-B magnet alloy ingot.

4. A production method for a rare earth magnet alloy ingot comprising receiving a molten alloy of rare earth metal alloy by means of a rotary body; sprinkling the molten alloy by the effect of rotation of the rotary body, and causing the sprinkled molten alloy to be deposited and solidify on an inner wall surface of a rotating cylindrical mold;

wherein a film having a thermal conductivity lower than that of material comprising the mold is provided to the inner wall surface of the cylindrical mold.

5. A production method for a rare earth magnet alloy ingot according to claim 4, wherein the inner wall surface of the rotating cylindrical mold is comprised of grooves having a depth of 0.3 to 1.0 mm.

6. A production method for a rare earth magnet alloy ingot according to claim 4, wherein the thermal conductivity of the film is 80 W/mK or less.

7. A production method for a rare earth magnet alloy ingot according to claim 4, wherein the film is made of a metal, a ceramic, or a metal-ceramic composite.

8. A production method for a rare earth magnet alloy ingot according to claim 4, wherein the film is provided on the inner wall surface of the mold by at least one selected from coating, plating, spray coating, and welding.

9. A production method for a rare earth magnet alloy ingot according to claim 4, wherein the film has a thickness falling within a range of 1 μm to 1 mm.

10. A production method for a rare earth magnet alloy ingot according to claim 4, wherein an axis of rotation of the rotary body and an axis of rotation of the cylindrical mold form an angle of inclination θ.

11. A production method for a rare earth magnet alloy ingot according to claim 4, wherein two or more layers comprising rare earth alloy ingot are deposited and casted on the inner wall surface of the mold.

12. A production method for a rare earth magnet alloy ingot according to claim 4, wherein the production method further comprises the step of hot-working the obtained rare earth alloy ingot at 500 to 1,1000° C.

13. A production method for a rare earth magnet alloy ingot according to claim 4, wherein the production method further comprises the step of hot-treating the obtained rare earth alloy ingot at 400 to 1,000° C.

14. A production method for a rare earth magnet alloy ingot according to claim 4, wherein the production method further comprises the steps of heat-treating the obtained rare earth alloy ingot at 1,000 to 1,100° C., and subsequently, heat-treating at 400 to 1,000° C.

15. A production method for a rare earth magnet alloy ingot according to claim 4, wherein the rare earth alloy ingot is an R-T-B magnet alloy (R represents at least one element selected from among rare earth elements, including Y; and T represents a substance predominantly comprising Fe, with a portion of Fe atoms being optionally substituted by Co, Ni, Cu, Al, Ga, Cr, and Mn).

16. A production method for a rare earth alloy flakes comprising receiving a molten alloy of rare earth metal alloy by means of a rotary body; sprinkling the molten alloy by the effect of rotation of the rotary body, and causing the sprinkled molten alloy to be deposited and solidify on an inner wall surface of a rotating cylindrical mold;
wherein a film having a thermal conductivity lower than that of material comprising the mold is provided to the inner wall surface of the cylindrical mold; and
wherein casting is performed while alloy flakes deposited on the inner wall surface of the cylindrical mold are scraped.

17. A production method for a rare earth alloy flakes according to claim 16, wherein the production method further comprises hot-treating the obtained rare earth alloy flakes at 400 to 1,000° C.

18. A production method for a rare earth alloy flakes according to claim 16, wherein the production method further comprises heat-treating the obtained rare earth alloy flakes at 1,000 to 1,100° C., and subsequently, an heat-treating at 400 to 1,000° C.

19. A production method for a rare earth alloy flakes according to claim 16, wherein rare earth alloy flakes are R-T-B magnet alloy flakes (R represents at least one element selected from among rare earth elements, including Y; and T represents a substance predominantly comprising Fe, with a portion of Fe atoms being optionally substituted by Co, Ni, Cu, Al, Ga, Cr, and Mn).

* * * * *